(12) United States Patent
Abe et al.

(10) Patent No.: US 12,491,067 B2
(45) Date of Patent: Dec. 9, 2025

(54) MULTIFOCAL DIFFRACTIVE LENS

(71) Applicant: KOWA COMPANY, LTD., Nagoya (JP)

(72) Inventors: Shuji Abe, Hamamatsu (JP); Yasuhiro Hishinuma, Hamamatsu (JP); Kotaro Mitsumoto, Hamamatsu (JP); Haruo Ishikawa, Hamamatsu (JP); Norio Shimizu, Hamamatsu (JP)

(73) Assignee: KOWA COMPANY, LTD., Nagoya (JP)

( * ) Notice: Subject to any disclaimer, the term of this patent is extended or adjusted under 35 U.S.C. 154(b) by 535 days.

(21) Appl. No.: 18/023,704

(22) PCT Filed: Oct. 7, 2021

(86) PCT No.: PCT/JP2021/037213
§ 371 (c)(1),
(2) Date: Feb. 27, 2023

(87) PCT Pub. No.: WO2022/075423
PCT Pub. Date: Apr. 14, 2022

(65) Prior Publication Data
US 2023/0301775 A1   Sep. 28, 2023

(30) Foreign Application Priority Data

Oct. 8, 2020  (JP) ................. 2020-170804

(51) Int. Cl.
*A61F 2/16* (2006.01)
*A61F 2/14* (2006.01)
(Continued)

(52) U.S. Cl.
CPC .......... *A61F 2/1618* (2013.01); *A61F 2/1654* (2013.01); *A61F 2/142* (2013.01); *G02B 5/1876* (2013.01); *G02B 27/4205* (2013.01)

(58) Field of Classification Search
None
See application file for complete search history.

(56) References Cited

U.S. PATENT DOCUMENTS

| 4,641,934 A | 2/1987 | Freeman |
| 5,117,306 A | 5/1992 | Cohen |

(Continued)

FOREIGN PATENT DOCUMENTS

| CN | 107920889 | 4/2018 |
| CN | 111065959 | 4/2020 |

(Continued)

OTHER PUBLICATIONS

International Preliminary Report on Patentability dated Oct. 18, 2022, issued in International Application No. PCT/JP2021/037213, 4 pages.

(Continued)

*Primary Examiner* — Javier G Blanco
(74) *Attorney, Agent, or Firm* — COZEN O'CONNOR

(57) ABSTRACT

A multifocal diffractive lens is provided which achieves efficient use of light. The multifocal diffractive lens 100 includes a diffraction grating 1c. Negative-order light L2 produces a focal point f2 for far vision and 0-order light L1 produces a focal point f1 nearer to that for far vision. The number of focal points is two or more. The focal position fc for far vision in polychromatic performance evaluation is located nearer to the multifocal diffractive lens than the focal position fs for far vision in monochromatic performance evaluation.

14 Claims, 14 Drawing Sheets

(51) Int. Cl.
   *G02B 5/18*     (2006.01)
   *G02B 27/42*    (2006.01)

(56)     References Cited

U.S. PATENT DOCUMENTS

| | | |
|---|---|---|
| 2006/0050234 A1 | 3/2006 | Morris et al. |
| 2011/0234974 A1 | 9/2011 | Lawn |
| 2018/0092739 A1* | 4/2018 | Pagnoulle ............ A61F 2/1654 |
| 2018/0132996 A1* | 5/2018 | Tiwari ................. A61F 2/1654 |
| 2018/0147050 A1 | 5/2018 | Choi et al. |
| 2019/0365528 A1 | 12/2019 | Choi et al. |
| 2020/0209649 A1 | 7/2020 | Holmstrom et al. |
| 2021/0220118 A1 | 7/2021 | Choi et al. |

FOREIGN PATENT DOCUMENTS

| | | |
|---|---|---|
| JP | S59-224818 | 12/1984 |
| JP | 2010-134282 | 6/2010 |
| JP | 2018-525199 | 9/2018 |
| JP | 2018531434 | 10/2018 |
| JP | 2019-537066 | 12/2019 |
| WO | 9411765 A1 | 5/1994 |
| WO | 2018093873 A1 | 5/2018 |
| WO | WO 2018/100459 | 6/2018 |
| WO | WO 2019/020435 | 1/2019 |

OTHER PUBLICATIONS

Search Report dated Sep. 19, 2024, issued in European Patent Application No. 21877722.5, 8 pages.
International Search Report issued in corresponding application No. PCT/JP2021/037213.
Notice of Reasons for Refusal dated Feb. 20, 2025 based on JP Patent Application No. 2022-555570.
Decision of Refusal (May 21, 2025) of the counterpart JP Application No. 2022-555570.
First Office Action (Jun. 11, 2025) of the counterpart CN Application No. 202180054437.1.
Office Action dated Jul. 21, 2025 of the counterpart IL application No. 301034.
Office Action dated Aug. 28, 2025 of the counterpart PH application No. 1-2023-550495.

* cited by examiner

FIG.4A A=-0.6D, n=1.52
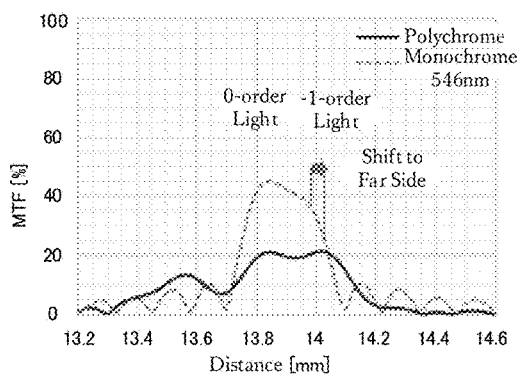
FIG.4B A=-0.75D, n=1.52
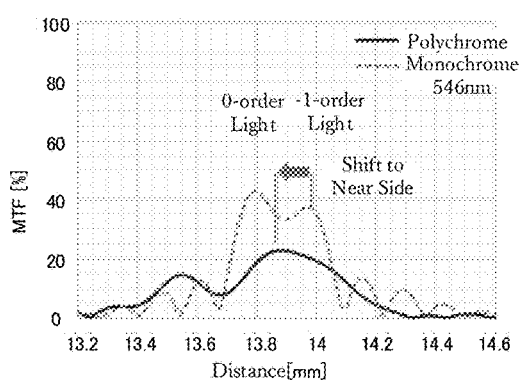
FIG.4C A=-1.5D, n=1.52
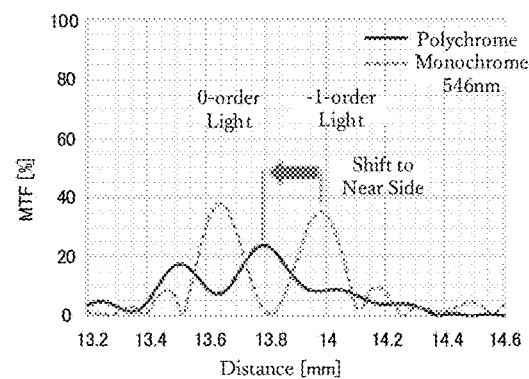
FIG.4D A=-2.0D, n=1.52
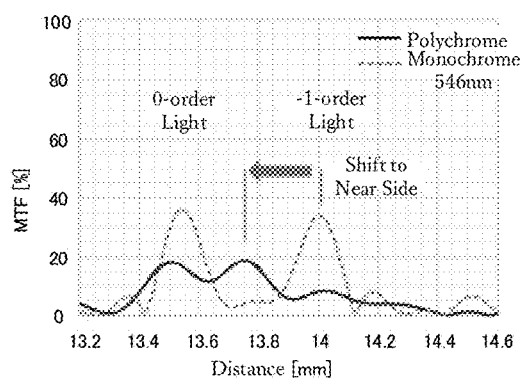
FIG.4E A=-3.0D, n=1.52
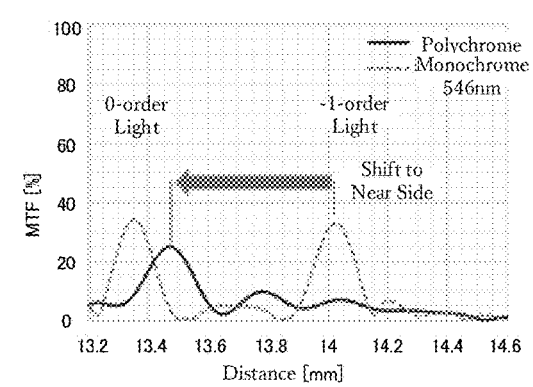

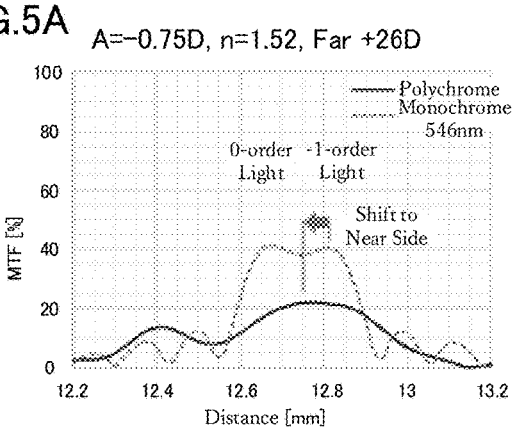
FIG.5A A=-0.75D, n=1.52, Far +26D
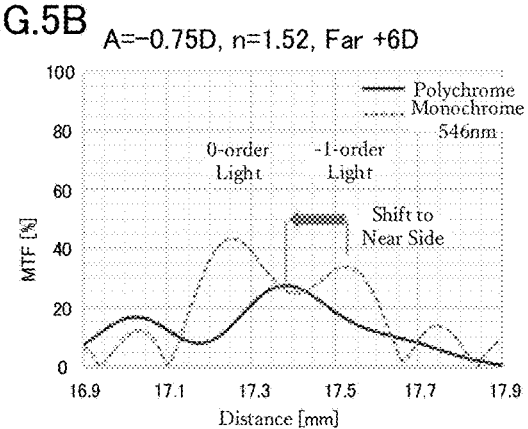
FIG.5B A=-0.75D, n=1.52, Far +6D
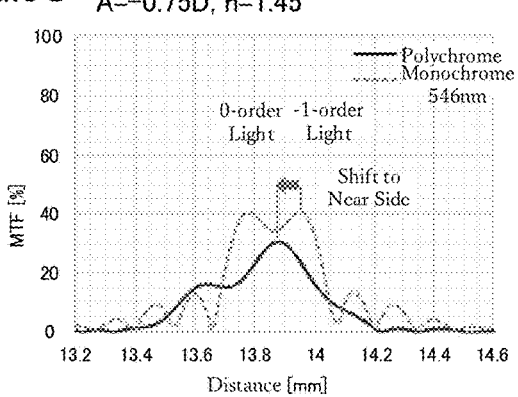
FIG.5C A=-0.75D, n=1.45
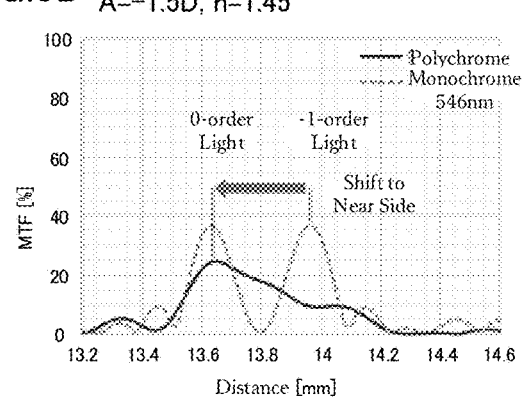
FIG.5D A=-1.5D, n=1.45
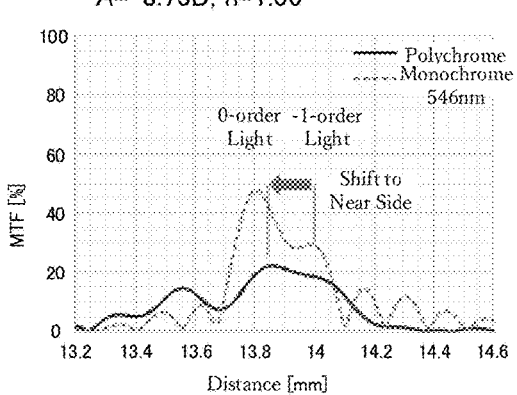
FIG.5E A=-0.75D, n=1.56
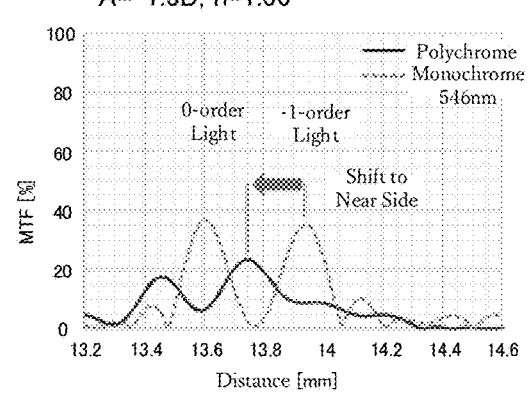
FIG.5F A=-1.5D, n=1.56

FIG.6A +1.5D Addition
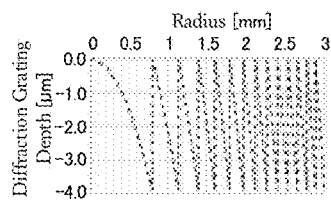
FIG.6B −1.5D Addition
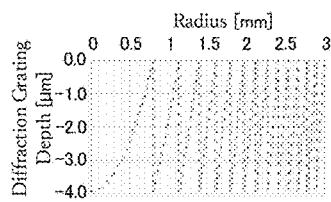
FIG.6C +1.5D&−1.5D Addition
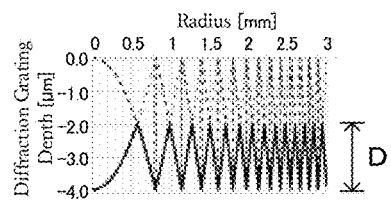
FIG.6D +1.5D Addition
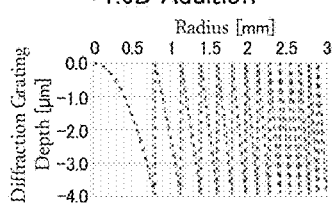
FIG.6E −1.5D Addition
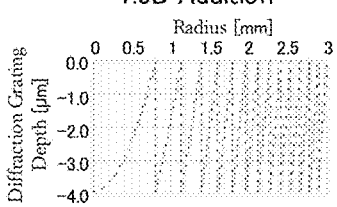
FIG.6F +1.5D&−1.5D Addition
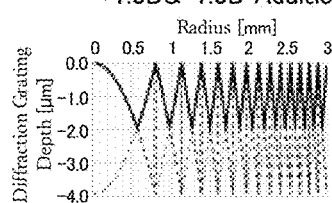
FIG.6G +1.5D Addition
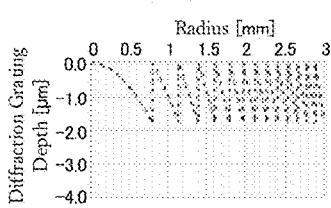
FIG.6H +3.0D Addition
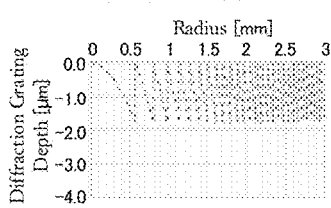
FIG.6I +1.5D&+3.0D Addition
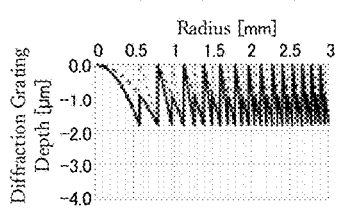
FIG.6J +1.0D&+2.0D Addition
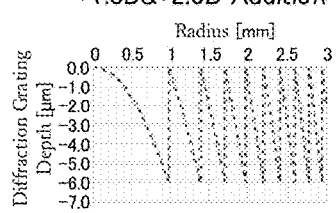
FIG.6K −1.0D Addition
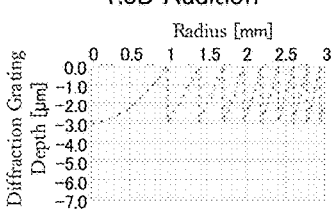
FIG.6L +2.0D&+1.0D&−1.0D Addition

MULTIFOCAL DIFFRACTIVE LENS

RELATED APPLICATIONS

This is a U.S. National Phase Application under 35 USC 371 of International Application PCT/FR2021/037213 filed on Oct. 7, 2021.

This application claims the priority of Japanese application no. 2020-170804 filed Oct. 8, 2020, the entire content of all of which is hereby incorporated by reference.

TECHNICAL FIELD

The present invention relates to multifocal diffractive lenses mainly used for intraocular lenses.

BACKGROUND

Conventional multifocal diffractive lenses are often configured to focus 0-order light (refracted light) at a focal point for far vision and focus +1-order light (diffracted light) at a focal point for near vision or intermediate vision. As an example of multifocal diffractive lenses of different types from the above, a multifocal ophthalmic lens is disclosed which is configured to focus +1-order light (diffracted light) at a focal point for far vision to reduce the chroma aberration (refer to International Publication No. 2018/100459 A1). As another example of multifocal diffractive lenses, a trifocal lens is disclosed which is configured to focus 0-order light (refracted light) at a focal point for intermediate vision, focus +1-order light (diffracted light) at a focal point for near vision, and focus-1-order light (diffracted light) at a focal point for far vision (refer to International Publication No. 2019/020435 A1 patent literature 2). Further, an ophthalmic lens is disclosed which has negative diffractive power to increase the range of chroma aberration (refer to JP S59-224818 A).

ISO 11979-2, which relates to test methods for optical properties of intraocular lenses, prescribes that the refractive power, the modular transfer function (MTF), and the like should be measured with monochromatic light sources of wavelengths of 546±10 nm. Specifications of intraocular lenses are determined based on these monochromatic performance evaluations. Here, as understood from the fact that the chroma aberration is discussed in International Publication No. 2018/100459 A1, attention has been paid to polychromatic (white) performance evaluation of multifocal lenses. The multifocal lens of International Publication No. 2018/100459 A1 does not however take account of misalignment between the focal position for monochromatic performance and the focal position for polychromatic performance, and commonly-used optical designing of intraocular lenses based on the monochromatic performance at a wavelength of 546±10 nm in accordance with ISO 11979-2 causes a shift of the focal position between the monochromatic performance and the polychromatic performance. A conventional multifocal diffractive lens is often such that the focal position for far vision in polychromatic performance evaluation is located farther from the multifocal diffractive lens than the focal position for far vision in monochromatic performance evaluation. In this case, light allocated to far vision is focused on the retina and behind the retina. This may prevent efficient use of light, causing mismatching of actual performances from the intraocular lens specification.

SUMMARY OF INVENTION

The present invention has been made in view of the problem discussed in the above-described Background, and an objective of the present invention is to provide a multifocal diffractive lens which allows efficient use of light.

To achieve the above-described objective, a multifocal diffractive lens according to the present invention includes a diffraction grating. Negative-order light produces a focal point for far vision while 0-order light produces a focal point nearer to the multifocal diffractive lens than that of the far vision. The number of focal points is two or more. A focal position for far vision in polychromatic performance evaluation is located nearer to the multifocal diffractive lens than the focal position for the far vision in monochromatic performance evaluation.

Since the above-described multifocal diffractive lens is configured as a multifocal lens that causes the focal point for far vision in polychromatic performance evaluation to be located nearer to the lens than the focal point for far vision in monochromatic performance evaluation, the focal point for far vision is located nearer to the intraocular lens (the multifocal diffractive lens) than the retina in the visual light range, which makes it possible to bring an object at a finite position into focus, allowing efficient use of light.

In a specific aspect of the present invention, the above-described multifocal diffractive lens causes positive-order light to further generate a focal point nearer to the multifocal diffractive lens than that of 0-order light and the number of focal points is three or more. In this case, it is possible to achieve image formation for three or more target distances.

In another aspect of the present invention, the diffraction grating is in a combined shape of kinoform profiles. In this case, the combination of the kinoform profiles enable to efficiently design a multifocal diffractive lens with a diffraction grating geometry that causes negative-order light to produce a focal point for far vison, 0-order light to produce a focal point nearer to the multifocal diffractive lens than that for far vision, and positive-order light to further produce a focal point nearer to the multifocal diffractive lens than that of 0-order light.

In still another aspect of the present invention, a correction term of a medium refractive index is added to the kinoform profiles. In this case, it is possible to correct a kinoform sag height by the correction term of the medium refractive index with an assumption of placement in liquid for in-eye use of the multifocal diffractive lens.

In still another aspect of the present invention, a correction term of the pupil dilation ratio is added to the kinoform profiles. The correction term of the pupil dilation ratio enables to achieve matching the power acquired for diffracted light with that of refracted light, even when simulations using design values for two methods where one of which is a method that adds refracted light power by modifying the curvature and the other is a method that adds diffracted light power by using a diffraction grating has proved that acquired power values are different although these two methods are intended to add the same power value.

In still another aspect of the present invention, the multifocal diffractive lens is a trifocal diffractive lens that has one additional focal point in addition to two focal points produced by a bifocal diffractive lens. The near addition power of the trifocal diffractive lens is twice of that of the bifocal diffractive lens, and the number of diffraction fringes is the same between the bifocal diffractive lens and the trifocal diffractive lens.

In still another aspect of the present invention, the multifocal diffractive lens is a quadrifocal diffractive lens that has two additional focal points in addition to two focal points produced by a bifocal diffractive lens. The near addition power of the quadrifocal diffractive lens is three times of that of the bifocal diffractive lens, and the number of diffraction fringes is the same between the bifocal diffractive lens and the quadrifocal diffractive lens.

In still another aspect of the present invention, the diffraction grating is in a combined shape of two kinoform profiles and has a height of half of a diffraction grating height of the two kinoform profiles. Light is allocated to negative-order light that produces a focal point farther from the multifocal diffractive lens than that of the 0-order light and positive-order light that produces a focal point nearer to the multifocal diffractive lens than that of the 0-order light. The order of the negative-order light is the same as the order of the positive-order light. In this case, the amounts of changes of the diffraction grating heights caused by the combining are the same, making it possible to substantially equalize the light allocation proportions to the negative-order light and the positive-order light.

In still another aspect of the present invention, the diffraction grating is in a combined shape of two kinoform profiles. The diffraction grating heights of the two kinoform profiles are different from each other. Light is allocated to negative-order light that produces a focal point farther from the multifocal diffractive lens than that of the 0-order light and positive-order light that produces a focal point nearer to the multifocal diffractive lens than that of the 0-order light. The order of the negative-order light and the order of the positive-order light are different from each other. In this case, the diffraction order light that produces focal points is increased, providing larger adjustment amounts for focal points.

In still another aspect of the present invention, a jagged part of the diffraction grating includes planarized regions. In this case, light potentially allocated to an unintended focal position of high-order light if the jagged part is not planarized can be allocated to a focal position of low-order light.

In still another aspect of the present invention, the multifocal diffractive lens is formed of optical material with normal dispersion with a material refractive index between 1.45 and 1.56, inclusive, at a wavelength of 546 nm. Power setting between respective focal points is 0.75D or more.

In still another aspect of the present invention, the multifocal diffractive lens has a pair of optical surfaces. One of the pair of optical surfaces includes the diffraction grating, and the other optical surface is in a toric shape. In this case, a multifocal diffractive lens for astigmatism correction is provided due to the toric shape of the other optical surface.

BRIEF DESCRIPTION OF THE DRAWINGS

FIGS. 4A to 4E are diagrams illustrating MTFs of multifocal diffractive lenses of Example 2.

FIGS. 5A to 5F are diagrams illustrating MTFs of other multifocal diffractive lenses of Example 2.

FIGS. 6A to 6F are diagrams illustrating diffraction grating geometries of multifocal diffractive lenses of Example 3 in a second embodiment.

FIGS. 6G to 6I are diagrams illustrating diffraction grating geometries of multifocal diffractive lenses of Comparative Example 2.

FIGS. 6J to 6L are diagrams illustrating diffraction grating geometries of the multifocal diffractive lenses of variations of Example 3.

DETAILED DESCRIPTION

First Embodiment

Figure 1A:
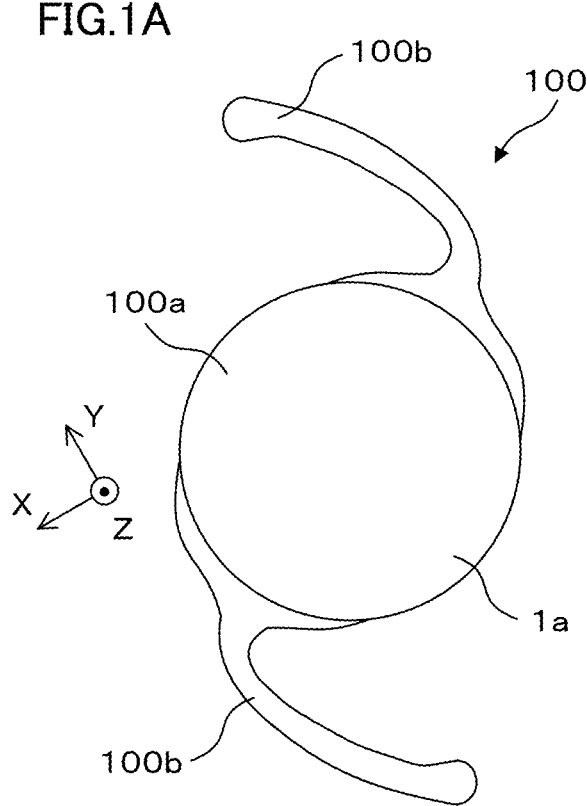
FIG. 1A is a plan view illustrating a multifocal diffractive lens in a first embodiment.
Figure 1B:
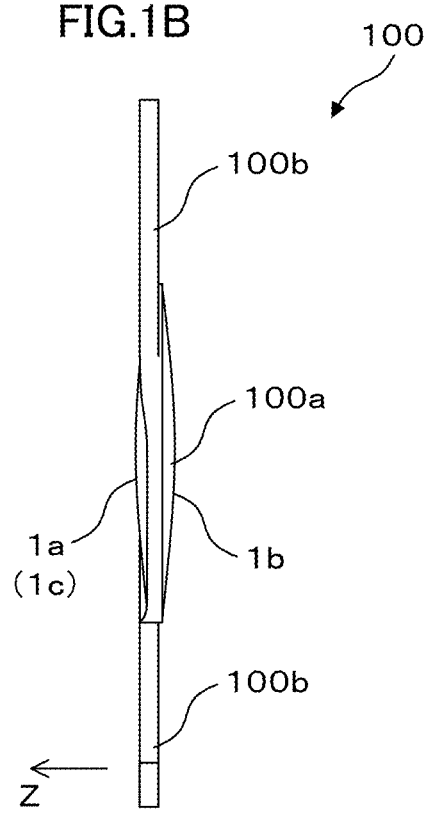
FIG. 1B is a side view illustrating the multifocal diffractive lens.
Figure 1C:
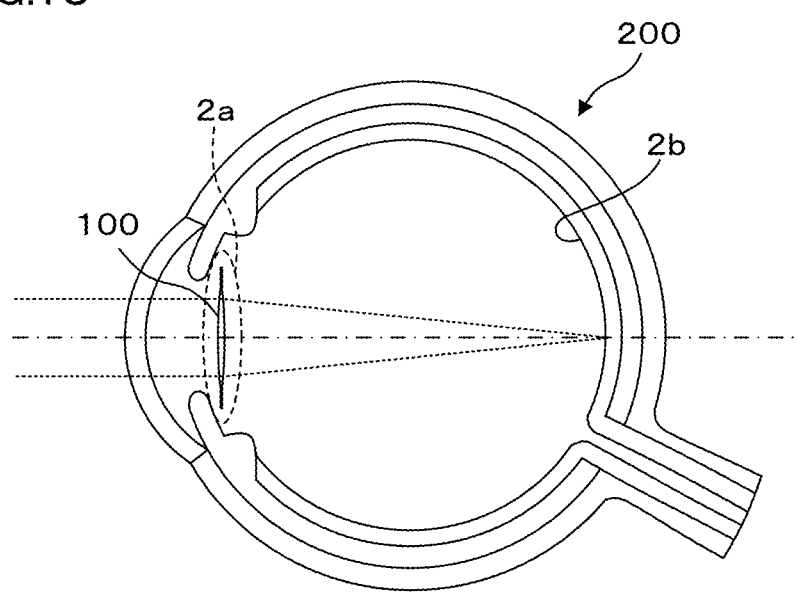
FIG. 1C is a schematic diagram illustrating an example use of the multifocal diffractive lens.

In the following, a description is given of a multifocal diffractive lens 100, which is a first embodiment of the present invention, with reference to FIG. 1 and other figures. FIG. 1A is a plan view of the multifocal diffractive lens 100, and FIG. 1B is a side view of the multifocal diffractive lens 100. FIG. 1C is a schematic diagram illustrating an example use of the multifocal diffractive lens 100.

The multifocal diffractive lens 100 shown in FIGS. 1A and 1B, which is used as an intraocular lens, includes a lens body 100a that functions as a replacement of a crystalline lens 2a in an eyeball 200 shown in FIG. 1C and two supports 100b that support the lens body 100a in the eyeball 200. The lens body 100a and the supports 100b are integrally formed. The lens body 100a has a first optical surface 1a, which is the anterior face, and a second optical surface 1b, which is the posterior face opposed to the first optical surface 1a. While the lens body 100a is configured as a biconvex lens in the shown example, one surface of the lens body 100a may be concave or flat depending on lens properties. The supports 100b include a curved protrusion protruding from the peripheral portion of the lens body 100a. It is noted that the lens body 100a and the supports 100b may be formed as separate members. As shown in FIG. 1C, in use of the multifocal diffractive lens 100, only the bulk of the interior of the crystalline lens 2a is removed, leaving the outermost capsular membrane (lens capsule), and the multifocal diffractive lens 100 is inserted and fixed in the capsule.

The multifocal diffractive lens 100 is formed of flexible soft material, such as thermoplastic resin, non-thermoplastic resin, or inorganic amorphous material. The multifocal diffractive lens 100 is formed of optical material with normal dispersion with a material refractive index between 1.45 and 1.56, inclusive, at a wavelength of 546 nm. For this case, it is desired that the power setting between respective focal points is 0.75D or more.

The multifocal diffractive lens 100 is configured as a combined body of a refractive lens structure and a diffraction grating 1c. The lens body 100a includes a diffraction grating 1c on the first optical surface 1a or the second optical surface 1b. In the shown example, the first optical surface 1a, which is one of the optical surfaces, is provided with the diffraction grating 1c while the second optical surface 1b, which is the other optical surface, is spherical or aspherical. The multifocal diffractive lens 100 causes negative-order light to produce a focal point for far vision and 0-order light to produce a focal point nearer to the multifocal diffractive lens 100 than that for far vision, while the number of focal points is two or more. The focal position for far vision in polychromatic performance evaluation is located nearer to the multifocal diffractive lens 100 than the focal position for far vision in monochromatic performance evaluation. The fact that the 0-order light (refracted light) produces the focal point nearer to the lens than that for far vision implies that the 0-order light, which is generated by light from a certain object passing through the lens, is focused nearer to the lens than −1-order light or the like from the same object passing through the lens. Considering the retina as the reference, the −1-order light allows farther vision than the 0-order light.

Figure 2A:
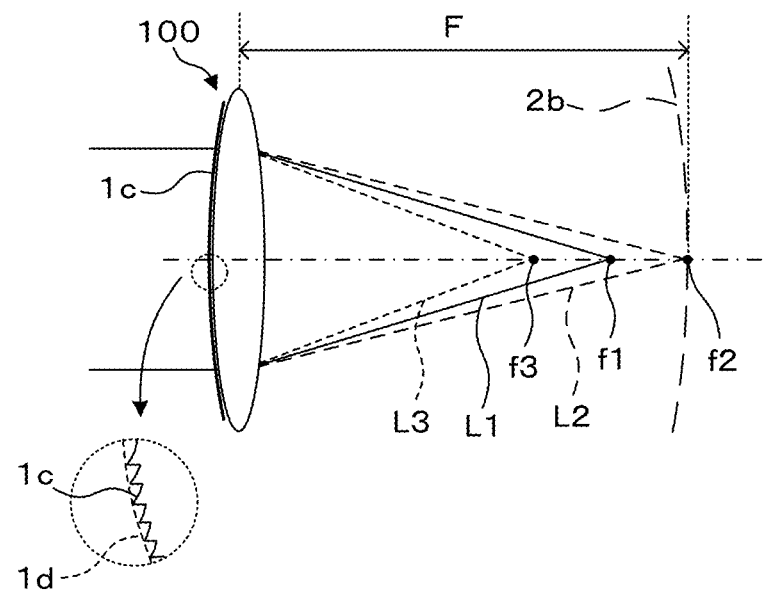
FIG. 2A is a diagram illustrating a relation between focal points of refracted light and diffracted light in the multifocal diffractive lens.
Figure 2B:
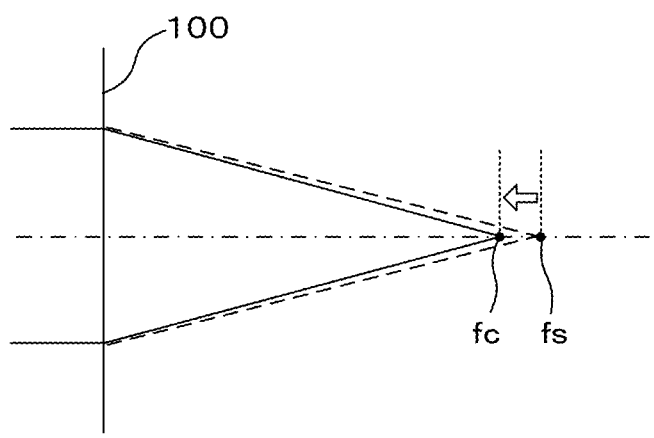
FIG. 2B is a diagram illustrating a relation between the focal point for monochromatic performance and the focal point for polychromatic performance.

FIG. 2A is a diagram illustrating the relation between the focal points of refracted light and diffracted light for the multifocal diffractive lens 100 and FIG. 2B is a diagram illustrating the relation between the focal point for monochromatic performance and the focal point for polychromatic performance. In the example of FIG. 2A, the multifocal diffractive lens 100 has a power of +20D for 0-order light (the refracted light) L1. Considering the focal point f1 of the 0-order light as the reference, negative-order light (e.g., −1-order light L2) produces a farther focal point f2 and the positive-order light (e.g., +1-order light L3) produces a nearer focal point f3. FIG. 2A shows infinity focal points of the multifocal diffractive lens 100, and the focal position of negative-order light, which is positioned farthest, is set at the imaging position on the retina 2b as the reference. With respect to 0-order light, positive-order light, and negative-order light other than that used as the reference, imaging on the retina 2b can be achieved for targets positioned at corresponding target distances. It is noted that the target distance means the distance to each of targets positioned distributedly from infinity toward the multifocal diffractive lens 100.

In this embodiment, a description is given of a configuration in which the multifocal diffractive lens 100 is configured as a bifocal diffractive lens to use 0-order light L1 and −1-order light L2. The multifocal diffractive lens 100 causes the 0-order light L1 to produce a focal point f1 for near vision and the −1-order light L2 to produce a focal point f2 for far vision. The multifocal diffractive lens 100 takes the distance F from the multifocal diffractive lens 100 to the retina 2b as the standard value for the focal position for far vision. In other words, the focal position of the −1-order light L2 corresponds to the distance F in this embodiment. It is noted that the focal length of the −1-order light L2 can be adjusted to the distance F with settings or design of the diffractive structure that produces the focal point for far vision.

As shown in FIG. 2B, the multifocal diffractive lens 100 is configured such that the focal position fc for far vision in polychromatic performance evaluation is located nearer to the multifocal diffractive lens 100 than the focal position fs for far vision in monochromatic performance evaluation as described above. In other words, the focal position fc for far vision in polychromatic performance evaluation is shifted nearer to the lens than the focal position fs for far vision in monochromatic performance evaluation.

By locating the focal point for far vision in polychromatic performance evaluation nearer to the multifocal diffractive lens 100, the focal point for far vision in the visual light range is located nearer to the multifocal diffractive lens 100, which is an intraocular lens, than the retina 2b, which makes it possible to bring an object at a finite position into focus, allowing efficient use of light. Concerning the arrangement of the focal position for far vision, reference is given to an example case in which the spherical aberration is left on the near side in relation to an intraocular lens. A specific description is given in the following. When an intraocular lens is undercorrected with the spherical aberration left on the near side, light is focused on the retina and nearer to the intraocular lens than the retina. Since the range of the aberration is left in the eye, the aberration can be used for focusing. For efficient use of light, an intraocular lens is often selected to be undercorrected with the spherical aberration left on the near side. Although this is an example case for monochromatic performance, it is considered that the same will apply to discussion concerning polychromatic performance. An intraocular lens is actually used in a polychromatic environment rather than a monochromatic environment, and it is desired to locate the focal position for far vision nearer to the intraocular lens than the retina for both monochromatic performance and polychromatic performance while the focal position is set at the standard position with respect to the monochromatic performance. Accordingly, it is desired that, as is the case with the multifocal diffractive lens 100 of this embodiment, the focal position for polychromatic performance is shifted nearer to the multifocal diffractive lens 100 than the focal position for monochromatic performance.

It is noted that consideration is given to chroma aberration in relation to the polychromatic performance. Since the chroma aberration for the refracted light produces a focal point for blue, which has a shorter wavelength than 546 nm, on the near side and produces a focal point for red, which has a longer wavelength than 546 nm, on the far side, focal points for blue, green, and red are produced in sequence from the near side. Further, focal points for red, green, and blue are produced in sequence from the near side for positive-order diffracted light while focal points for blue, green, and red are produced in sequence from the near side for negative-order diffracted light. In other words, with respect to the chroma aberration that affects the diffracted light, positive-order light exhibits chroma aberration opposite to that of the refracted light while negative-order light exhibits chroma aberration in the same direction as that of the refracted light. Additionally, it is known that a multifocal diffractive lens compensates chroma aberration that occurs in the refracted light with chroma aberration that occurs in the diffracted light. Accordingly, common diffractive lenses are often configured to produce a focal point for blue with a wavelength shorter than 546 nm farther away from a focal point for green with a design wavelength of around 546 nm. In other words, common diffractive lenses exhibit chroma aberration opposite to that of usual refractive lenses, producing focal points for red, green, and blue in sequence from the near side. In relation of focal points for far vision of the multifocal diffractive lens 100 of this embodiment, focal points for blue, green, and red are produced in sequence from the near side, since the focal point for blue is produced nearer than the focal point for green, although the multifocal diffractive lens 100 is a diffractive lens.

With respect to the multifocal diffractive lens 100, the fact that light intensities of reflected light and diffracted light in polychromatic performances varies depending on the wavelength is utilized to shift the focal position for far vision in polychromatic performance evaluation from the focal position for far vision in monochromatic performance evaluation. When the light intensity for 546 nm from a monochromatic light source is taken as the reference, the refracted light exhibits a decrease in the light intensity for shorter wavelengths while exhibiting an increase in the light intensity for longer wavelengths only with a reduced increase amount. In contrast, the diffracted light exhibits an increase in the light intensity for shorter wavelengths while exhibiting a decrease in the light intensity for longer wavelengths. More specifically, −1-order light (light for far vision) exhibits an increase in the light intensity for shorter wavelengths (blue) than 546 nm, causing a shift toward the lens in relation to the polychromatic performances. In contrast, 0-order light (light for near vision) exhibits an increase in the light intensity for longer wavelengths (red) than 546 nm, causing a shift away from the lens in relation to the polychromatic performances. Assigning negative-order light (diffracted light) to the focal point for far vision and 0-order light (refracted light) to a focal point nearer to the lens than that for far vision allows the focal point for far vision in polychromatic performance evaluation to be located nearer to the lens than the focal point for far vision in monochromatic performance evaluation, because, in the polychromatic performances, wavelength ranges that cause increases in the light intensity concentrate between negative-order light (diffracted light) and 0-order light (refracted light) in the monochromatic performances.

In the following, a description is given of optical surfaces of the multifocal diffractive lens 100. The refractive lens structure of the multifocal diffractive lens 100 is represented by a 0-order hypothetical reference surface 1d shown in FIG. 2A. The refractive lens structure may be spherical or aspherical. It is noted that the following aspherical profile formula is used for the reference surface 1d. Here, the $x^{th}$-order aspherical coefficient may be set to 0. Also, a conic constant k and a fourth-order aspherical coefficient $A_4$ may be used, and a sixth-order aspherical coefficient $A_6$ and an eighth-order aspherical coefficient $A_8$ may be further used.

$$z(r) = \frac{\left(\frac{1}{R}\right)r^2}{1 + \sqrt{1 - (1+k)\left(\frac{1}{R}\right)^2 r^2}} + A_4 r^4 + A_6 r^6 + A_8 r^8 + \dots ,$$

where:
z(s)=sag height
r=distance from optical axis (radius)
R=curvature radius
k=conic constant
$A_4$=fourth-order aspherical coefficient
$A_6$=sixth-order aspherical coefficient
$A_8$=eighth-order aspherical coefficient Further, the diffraction grating 1c has a shape designed with a kinoform profile. In other words, the diffraction grating 1c has a diffraction pattern based on the kinoform profile, acquired by appropriately adjusting the thickness or step height of the kinoform and intervals or pitches of the circular zones with respect to the 0-order hypothetical reference surface 1d. In the shown example, which shows the diffraction patterns of 0-order light and first-order light, each circular zone of the kinoform has a concave recessed toward the lens body 100a from the reference surface 1d.

In calculating the diffraction grating height h(r) of the diffraction grating 1c, the kinoform profile formula described in the below-recited reference literature was used with a modification of parameters (more specifically, $n_A(\lambda_0)$ and M). Correction terms for the medium refractive index and the pupil dilation ratio are added to the kinoform profile formula. More specifically, the medium refractive index $n_A$ in the formula is a correction term for placement in liquid, and the pupil dilation ratio M is a correction term for matching the power acquired for diffracted light with that of refracted light. It is noted that the original formula uses a medium refractive index of 1.0 for air with an assumption of placement in air. In the formula, r is the distance from the optical axis (radius), m identifies the diffraction fringes (m=0, 1, 2, . . . ), $n_L$ is the material refractive index, $\lambda_0$ is the design wavelength, a is a coefficient for adjusting the kinoform sag height s(r), and P is the diffracted light power to be added.

Reference Literature: Dale A. Buralli, G. Michael Morris, and John R. Rogers., "Optical performance of holographic kinoforms", Applied Optics, vol. 28, No. 5, 976 (1989)

$$s(r) = \frac{m\lambda_0}{n_L(\lambda_0) - n_A(\lambda_0)} + \frac{cr^2}{1 + \sqrt{1 - (\kappa + 1)c^2 r^2}},$$

$$c = \frac{1}{f\{n_A(\lambda_0) - n_L(\lambda_0)\} + m\lambda_0},$$

$$\kappa = -n_L^2(\lambda_0),$$

$$m = \frac{r_m^2}{2\lambda_0 f},$$

$$\rightarrow m = m(r) - \text{MOD}\{m(r), m_{order}\},$$

$$f = \frac{1000}{M \times P}, \text{ and}$$

$$\Rightarrow h(r) = s(r) \times \alpha.$$

The light allocation to any two focal points varies when the diffraction grating height is adjusted by the coefficient α in the above formula. In other words, the acquired order varies based on adjustment of the diffraction grating height. For example, 0-order light is acquired for α=0 and +1-order light is acquired for α=1, while 0-order light and +1-order light are acquired for α=0.5. Meanwhile, −1-order light is acquired for α=−1 and −2-order light is acquired for α=−2, while −1-order light and −2-order light are acquired for α=−1.5. It is noted that the number of diffraction fringes depends on the diffraction addition power. Further, in this calculation, the focal length f is determined on the ground of a pupil dilation ratio M=1.13 as one example. Simulation using design values for two methods, where one of which is a method that adds refracted light power by modifying the curvature and the other is a method that adds diffracted light power with a diffraction grating, has proved that acquired power values are different although these two methods are intended to add the same power value. Since (power addition amount for diffracted light)≈(power addition amount for refracted light)/1.13, the correction term of M is added to equalize the power addition amounts. In consideration that the diffraction power becomes 1/1.13 times because the pitch of the diffraction grating fringes is increased to M (=1.13) times on the actual pupil surface, the formula is designed to increase the diffraction power to 1.13 times on the lens surface. It is noted that M may not be necessarily considered as 1.13; M may be 1.

The above-described multifocal diffractive lens 100, which is configured as a multifocal diffractive lens which causes the focal point for far vision in polychromatic performance evaluation to be located nearer to the lens than the focal point for far vision in monochromatic performance evaluation, is able to bring an object at a finite position into focus with efficient use of light, since the focal point for far vision in the visual light range is located nearer to the multifocal diffractive lens 100, which is an intraocular lens, than the retina 2b. Accordingly, it is possible to avoid a risk of hyperopia in a white light source environment (polychromatic performance) when commonly-used optical designing of an intraocular lens is performed based on the wavelength of 546 nm (monochromatic performance) in accordance with ISO 11979-2.

Example 1

<MTF Simulation of Bifocal Diffractive Lens +1.5D (Comparison Between Example 1 and Comparative Example 1)>

In Example 1, it is described that light can be efficiently used in polychromatic performance evaluation when a bifocal diffractive lens causes 0-order light to produce a focal point for near vision and causes −1-order light to produce a focal point for far vision.

In Example 1, an MTF simulation of the multifocal diffractive lens 100 was performed as follows (the same applies to subsequent Examples). As polychromatic performance evaluation to evaluate optical performances for white light, as exemplified by sunlight, simulation using five wavelengths of 430 nm, 490 nm, 546 nm, 590 nm, and 650 nm in the visual light range of 380 nm to 780 nm was performed. It is noted that the selection of these wavelengths is mere one example to represent white light. Comparison was made with a number of MTF line pairs of 50 lp/mm Meanwhile, simulation for monochromatic performance evaluation was performed for a wavelength of 546 nm since ISO 11979-2:2014, Annex C (MTF) prescribes that measurements should be performed using a monochromatic light source of a wavelength of 546±10 m.

Figure 3A:
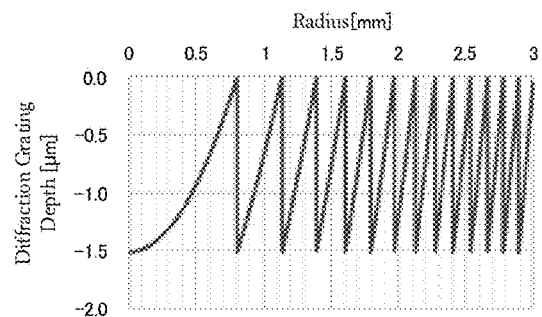
FIG. 3A is a diagram illustrating a diffraction grating geometry of a multifocal diffractive lens of Example 1.
Figure 3D:
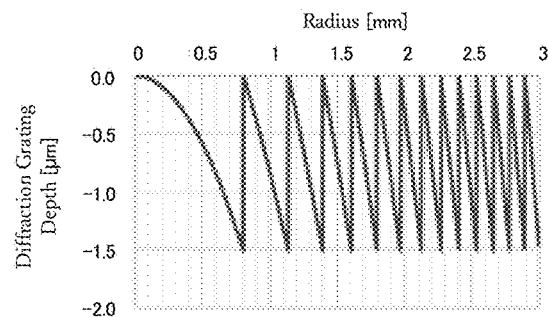
FIG. 3D is a diagram illustrating a diffraction grating geometry of a multifocal diffractive lens of Comparative Example 1.
Figure 3B:
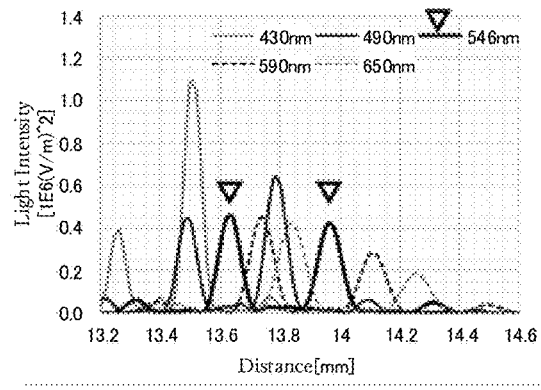
FIG. 3B is a diagram illustrating light intensities for the case where the multifocal diffractive lens of Example 1 is incorporated.
Figure 3E:
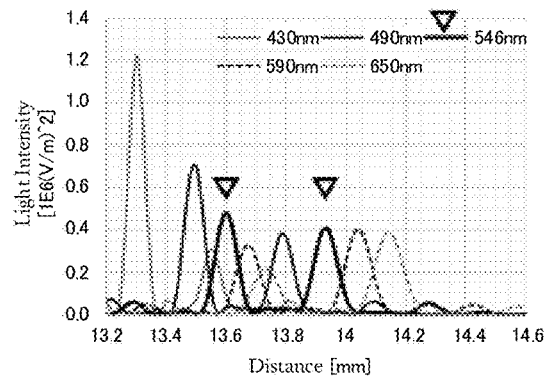
FIG. 3E is a diagram illustrating light intensities for the case where the multifocal diffractive lens of Comparative Example 1 is incorporated.
Figure 3C:
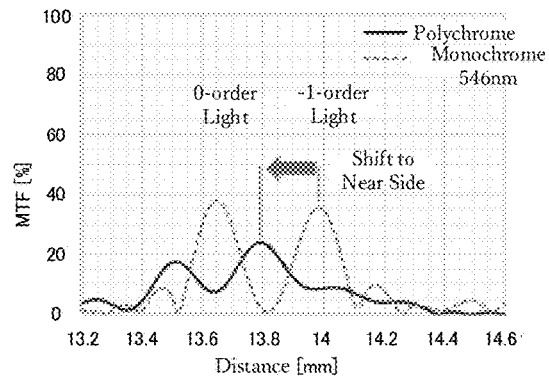
FIG. 3C is a diagram illustrating MTFs of the multifocal diffractive lens of Example 1.
Figure 3F:
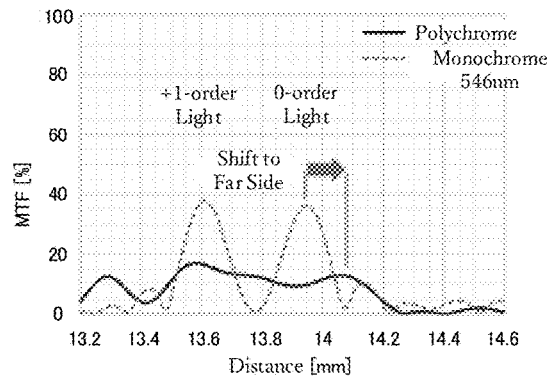
FIG. 3F is a diagram illustrating MTFs of the multifocal diffractive lens of Comparative Example 1.

In Example 1, comparison was made with bifocal diffractive lenses with +20D for far vision and +21.5D for near vision. In Example 1, 0-order light produces a focal point for near vision and −1-order light produces a focal point for far vision. In Comparative Example 1, 0-order light produces a focal point for far vision and +1-order light produces a focal point for near vision. FIG. 3A is a diagram illustrating the diffraction grating geometry with additions of −1.5D and 0D in Example 1. FIG. 3B is a diagram illustrating light intensities for refraction of +21.5D (near vision) and diffraction of −1.5D (far vision) in Example 1. FIG. 3C is a diagram illustrating MTFs for refraction of +21.5D and diffraction of −1.5D in Example 1. FIG. 3D is a diagram illustrating the diffraction grating geometry with additions of +1.5D and 0D in Comparative Example 1. FIG. 3E is a diagram illustrating light intensities for refraction of +20D (far vision) and diffraction of +1.5D (near vision) in Comparative Example 1. FIG. 3F is a diagram illustrating MTFs for refraction of +20D and diffraction of +1.5D in Comparative Example 1. In FIGS. 3A and 3D, the negative direction of the diffraction grating depth (the diffraction grating height) indicates the direction towards the lens body 100a in the multifocal diffractive lens 100 (the same applies to other embodiments).

As shown in FIG. 3C, the MTF result of Example 1 indicates that the focal position for far vision of polychromatic performance is shifted nearer to the lens than the focal position for far vision of monochromatic performance. In contrast, as shown in FIG. 3F, the MTF result of Comparative Example 1 indicates that the focal position for far vision of polychromatic performance is shifted farther from the lens than the focal position for far vision of monochromatic performance. This can be explained from the light intensity results for polychromatic performance shown in FIGS. 3B and 3E. Diffracted light passing through the diffraction grating designed for a wavelength of 546 nm is characterized by increased light intensities for wavelengths shorter than the design wavelength and reduced light intensities for wavelengths longer than the design wavelength. In contrast, it can be said that there are substantially no variations in the light intensity of refracted light. According to the light intensity result of Example 1 shown in FIG. 3B, there exist, between the focal position for far vision and the focal position for near vision, a shorter wavelength region with increased light intensities positioned nearer than the focal position for far vision and a longer wavelength region with maintained light intensities positioned farther than the focal position for near vision. In contrast, according to the light intensity result of Comparative Example 1 shown in FIG. 3E, there exist, between the focal position for far vision and the focal position for near vision, a shorter wavelength region with maintained light intensities positioned nearer than the focal position for far vision and a longer wavelength region with reduced light intensities positioned farther than the focal position for near vision. In Example 1, these distributions of the resulting light intensities suggest that the focal position for far vision for polychromatic performance is shifted nearer to the lens than the focal position for far vision for monochromatic performance in the MTF results because the wavelength ranges with increased light intensities concentrate between the focal position for far vision and the focal position for near vision.

As in Example 1, by using a multifocal lens that causes the focal point for far vision in polychromatic performance evaluation to be located nearer to the lens than the focal point for far vision in monochromatic performance evaluation, the focal point for far vision is located nearer to the intraocular lens (the multifocal diffractive lens) than the retina in the visual light range, which allows efficient use of light.

Example 2

<Simulation for Various Refractive Indices and Powers Between Focal Points>

In Example 2, it is described that respective power settings between focal points are desirably 0.75D or more for lens materials with material refractive indices n of 1.45 to 1.56 at a wavelength of 546 nm.

As shown in FIGS. 4A to 4E, for bifocal diffractive lenses of lens material with a material refractive index of n=1.52 at a wavelength of 546 nm that produce +20D for far vision by −1-order light (hereinafter, the addition power is referred to as A) and (+20-A) D for near vision by 0-order light, focal points for far vision of monochromatic performance and polychromatic performance were compared through simulation for the case where the addition powers A are adjusted to five values, −0.6D, −0.75D, −1.5D, −2.0D, and −3.0D. The result was that, as shown in FIG. 4A, the addition power A=−0.6D resulted in that the focal point for far vision of polychromatic performance is shifted farther from the lens than the focal point for far vision of monochromatic performance, while other addition powers resulted in that the focal point for far vision of polychromatic performance is shifted nearer to the lens from the focal point for far vision of monochromatic performance as shown in FIGS. 4B to 4E. This confirmed that, with the diffraction grating geometry of this embodiment, the effect of the invention was acquired when the power difference settings between focal points is 0.75D or more.

Next, as shown in FIGS. 5A and 5B, in relation to lens material with a material refractive index of n=1.52 at a wavelength of 546 nm, simulations were performed for a bifocal diffractive lens that produces +26D for far vision by −1-order light (with an addition power A=−0.75D) and +26.75D for near vision by 0-order light and a bifocal diffractive lens that produces +6D for far vision by −1-order light (with an addition power A=−0.75D) and +6.75D for near vision by 0-order light. The simulations confirmed that, for both the powers for far visions, the focal point for far vision of polychromatic performance is shifted nearer to the lens from the focal point for far vision of monochromatic performance. This result confirmed that the effect of the invention was similarly acquired also when the power setting for far vison is modified.

Further, as shown in FIGS. 5C to 5F, with respect to a bifocal diffractive lens that produces +20D for far vision by −1-order light (with an addition power A=−0.75D) and +20.75D for near vision by 0-order light and a bifocal diffractive lens that produces +20D for far vision by −1-order light (with an addition power A=−1.5D) and +21.5D for near vision by 0-order light, simulations are respectively performed for lens material with a material refractive index of n=1.45 at a wavelength of 546 nm and lens material with a material refractive index of n=1.56 at the wavelength of 546 nm. The simulations confirmed that, in both the conditions, the focal point for far vision of polychromatic performance is shifted nearer to the lens from the focal point for far vision of monochromatic performance. This result confirmed that the effect of the invention was similarly acquired for lens materials with material refractive indices of $1.45 \leq n \leq 1.56$ at the wavelength of 546 nm.

The above-describe results confirmed that respective power settings between focal points are desirably 0.75D or more for lens materials with material refractive indices n of 1.45 to 1.56 at the wavelength of 546 nm.

Second Embodiment

In the following, a description is given of a multifocal diffractive lens according to a second embodiment. It is noted that the multifocal diffractive lens of the second embodiment is a modification of the multifocal diffractive lens of the first embodiment, configured similarly to the first embodiment if not specifically described.

In this embodiment, the multifocal diffractive lens 100 further causes positive-order light to produce a focal point nearer to the lens than the focal point of the 0-order light while the number of the focal points is three or more. This enables image formation for three or more target distances. The multifocal diffractive lens 100 is a trifocal diffractive lens that has one additional focal point in addition to two focal points produced by the bifocal diffractive lens, and the near addition power of the trifocal diffractive lens is twice of that of the bifocal diffractive lens while the number of diffraction fringes is the same. In other words, the near addition power of the trifocal diffractive lens with an additional nearer focal point is twice of that of the bifocal diffractive lens. The trifocal diffractive lens, which has one additional focal point in addition to two focal points produced by the bifocal diffractive lens, is acquired by combining two kinoform profiles with different addition powers.

When the multifocal diffractive lens 100 is configured as a trifocal diffractive lens, the diffraction grating of the multifocal diffractive lens 100 is a combination of two kinoform profiles and has a height of half of the diffraction grating height of the two kinoform profiles (for example, the diffraction grating depth D shown in FIG. 6C referred later). Light is allocated to negative-order light that produces a focal point farther from the lens than that of 0-order light and positive-order light that produces a focal point nearer to the lens than that of the 0-order light, wherein the order of the negative-order light is the same as the order of the positive-order light. This results in that the amounts of changes of the diffraction grating heights caused by the combining are the same, making it possible to substantially equalize the light allocation proportions to the negative-order light and the positive-order light.

The multifocal diffractive lens 100, when configured as a trifocal diffractive lens, for example, causes 0-order light to produce a focal point for intermediate vision, −1-order light to produce a focal point for far vision, and +1-order light to produce a focal vision for near vision.

Alternatively, the multifocal diffractive lens 100 may be a quadrifocal diffractive lens that has two additional focal points in addition to two focal points produced by the bifocal diffractive lens, and the near addition power of the quadrifocal diffractive lens may be three times of that of the bifocal diffractive lens while the number of diffraction fringes may be the same. In other words, the near addition power of the quadrifocal diffractive lens with additional nearer focal points is three times of that of the bifocal diffractive lens. The quadrifocal diffractive lens, which has two additional focal points in addition to two focal points produced by the bifocal diffractive lens, is acquired by combining two kinoform profiles with different addition powers.

When the multifocal diffractive lens 100 is configured as a quadrifocal diffractive lens, the diffraction grating heights of the two kinoform profiles are different from each other in the diffraction grating, and light is allocated to negative-order light that produces a focal point farther from the multifocal diffractive lens 100 than that of 0-order light and positive-order light that produces a focal point nearer to the multifocal diffractive lens 100 than that of the 0-order light while the order(s) of the negative-order light is different from the order(s) of the positive-order light. This configuration increases the diffraction order light that produces a focal point, providing a larger allowed focal point adjustment. In this case, the orders of the negative-order light and positive-order light are different. In one example, there are four focal points for −1-order, 0-order, +1-order, and +2-order.

Example 3

<Comparison Between Diffraction Grating Geometry with Constant Addition Power Settings for Trifocal Diffractive Lens and Diffraction Grating Geometry with Additions of +1.5D and +3D (Conventional Kinoform)>

In Example 3, a description is given of addition powers in combining two kinoform profiles for the trifocal diffractive lenses.

The multifocal diffractive lens 100 is configured as a trifocal diffractive lens by combining two kinoform profiles with different addition powers. FIG. 6C is a diagram illustrating a diffraction grating geometry design with "max" selection in Example 3, showing the diffraction grating geometry acquired by combining a diffraction grating geometry with a +1.5D addition shown in FIG. 6A and a diffraction grating geometry with a −1.5D addition shown in FIG. 6B. FIG. 6F is a diagram illustrating a diffraction grating geometry design with "min" selection in Example 3, showing the diffraction grating geometry acquired by combining a diffraction grating geometry with a +1.5D addition shown in FIG. 6D and a diffraction grating geometry with a −1.5D addition shown in FIG. 6E. It is noted that, in the diffraction grating geometry designing, "max" selection selects the deeper one of the diffraction grating geometries while "min" selection selects the shallower one of the diffraction grating geometries. FIG. 6I is a diagram illustrating commonly-used diffraction grating geometry designing in Comparative Example 2, showing a diffraction grating geometry acquired by combining a diffraction grating geometry with a +1.5D addition shown in FIG. 6G and a diffraction grating geometry with a +3.0D addition shown in FIG. 6H.

As shown in FIGS. 6C, 6F, and 6I, when addition power settings of the trifocal diffractive lens are constant, the number of diffraction fringes of this embodiment is reduced, providing a diffractive grating geometry that is easy to machine. The diffraction grating height (diffraction grating depth D) of the trifocal diffractive lens is half of the diffraction grating height of the two kinoform profiles. In this case, it is possible to produce negative-order light focused on a focal point farther from the lens than the focal point of 0-order light and positive-order light focused on a focal point nearer to the lens than the focal point of 0-order light, while the orders of the negative-order light and the positive-order light are the same. When $\alpha=1.0$, for example, a trifocal diffractive lens of −1-order, 0-order, and +1-order is provided. When $\alpha=2.0$, the diffracted light is relatively stronger than 0-order light, producing four focal points of −2-order, −1-order, +1-order, and +2-order. In relation to the diffraction grating height for this configuration, as a result of adjustment of light allocation to three focal points, $\alpha=1.3$ for the diffraction grating geometry of this example and $\alpha=0.6$ for the commonly used diffraction grating geometry; it is however noted that this is mere one example.

Also, as a variation of Example 3, the two kinoform profiles with the different addition powers may have different diffraction grating heights. More specifically, a quadrifocal lens is provided by setting the coefficient $\alpha$ to a different value. FIG. 6L is a diagram illustrating a diffraction grating geometry design with "min" selection in the variation of Example 3, showing a diffraction grating geometry acquired by combining a diffraction grating geometry with +1.0D and +2.0D additions shown in FIG. 6J and a diffraction grating geometry with a −1.0D addition shown in FIG. 6K. It is preferable that, when one of the kinoform profiles involves $x\alpha$, the other kinoform profile involves $2\times\alpha$, although this does not limit the setting of the coefficient $\alpha$. In this case, it is possible to produce negative-order light focused on a focal point farther from the lens than the focal point of 0-order light and positive-order light focused on a focal point nearer to the lens than the focal point of 0-order light, wherein the orders of the negative-order light and the positive-order light are different. With kinoform profiles with addition powers of −1.0D and +1.0D are set to $\alpha=1.0$ and $\alpha=2.0$, respectively, for example, a quadrifocal lens of −1-order, 0-order, +1-order, and +2-order is provided. By using $\alpha=2.0$ for the kinoform profile of +1.0D, the diffractive light becomes relatively stronger for positive orders, allowing efficient extraction of +2-order light in addition to +1-order light. Although commonly-used diffraction grating geometries experience an increase in the number of diffraction fringes when the number of focal points increases, a feature of the diffraction grating geometry of this embodiment is that the diffraction grating geometry of this embodiment allows an increase in the number of focal points without increasing the number of diffraction fringes. Although the two kinoform profiles have been set to $\alpha=1.0$ and $\alpha=2.0$, respectively, this is mere one example. The light intensity ratio of the respective focal points can be adjusted by settings of the coefficient $\alpha$.

Described in the following are example settings of the coefficient $\alpha$. A description is given of a quadrifocal lens which is acquired by modifying the quadrifocal lens for which the kinoform profiles with addition powers of −1.0D and +1.0D are set to α=1.0 and α=2.0, respectively, as shown in FIG. 6L, which illustrates a variation of Example 3, such that the kinoform profiles are set to α=1.3 and α=2.0, respectively.

Figure 12A:
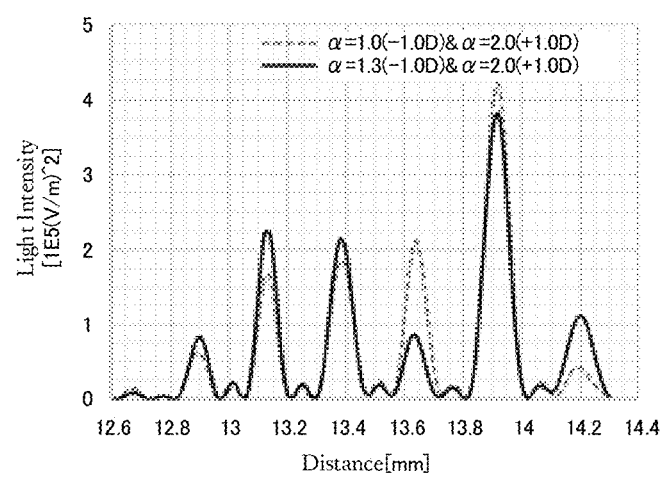
FIG. 12A is a diagram illustrating light intensities of quadrifocal lenses with different values of a coefficient $\alpha$ of kinoform profiles in variations of Example 3 shown in FIG. 6L.
Figure 12B:
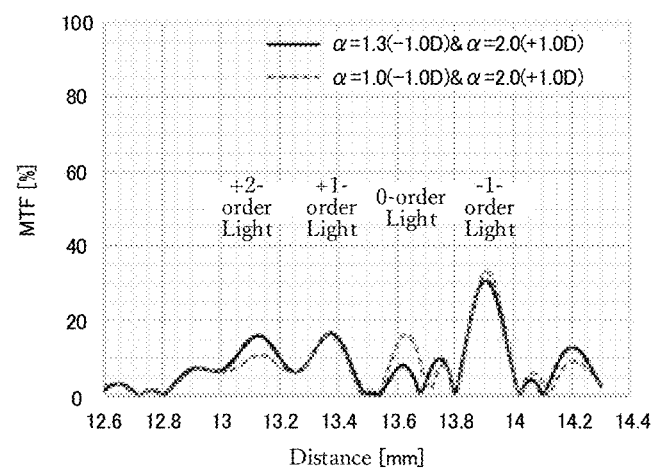
FIG. 12B is a diagram illustrating MTFs of the above-described quadrifocal lenses with the different values of the coefficient α.

FIG. 12A is a diagram illustrating the light intensity of the above-mentioned quadrifocal lens with the modified values of the coefficient α for the kinoform profiles in the variation of Example 3 shown in FIG. 6L, and FIG. 12B is a diagram illustrating the MTF of the above-mentioned quadrifocal lens with the modified values of the coefficient α.

As shown in FIG. 12A, comparison of the light intensity peaks at the respective focal positions indicates that the light intensity peak at the focal point for near vision (+2-order light) is increased to balance the decrease or elimination of the light intensity peak at the focal point for intermediate vision (0-order light). It can be confirmed that the light allocation ratio to the respective focal positions can be adjusted by modifying the settings of the coefficient α. As shown in FIG. 12B, the MTF result also indicates a similar result to the light intensity. While the setting of the coefficient α has been modified here for the kinoform profile with the addition power of +1.0D, the setting of the coefficient α may be modified for the kinoform profile with the addition power of −1.0D. Also, the settings of the coefficient α for both the kinoform profiles may be modified, and the addition powers may be modified.

Third Embodiment

In the following, a description is given of a multifocal diffractive lens, according to a third embodiment. It is noted that the multifocal diffractive lens of the third embodiment is a modification of the multifocal diffractive lenses of the first and second embodiments, configured similarly to the first embodiment and the like if not specifically described.

In this embodiment, a jagged part 300 of the diffraction grating of the multifocal diffractive lens 100 includes planarized regions 3c (see FIGS. 7A and 7B referred later). This enables to allocate light to a focal position of low-order light while the light may be potentially allocated to an unintended focal position of high-order light if the jagged part 300 is not planarized. It is noted that the inclusion of the planarized regions 3c means that the ridge height and the groove depth are restricted, including forming into a slanting shape, an arc-like shape or the like as well as into a flat shape.

Example 4

<Planarization of Jagged Part in Trifocal Diffractive Lens>

In Example 4, a description is given of a trifocal diffractive lens in which planarized regions 3c are disposed in the jagged part 300 of the diffraction grating geometry of the multifocal diffractive lens 100.

Figure 7A:
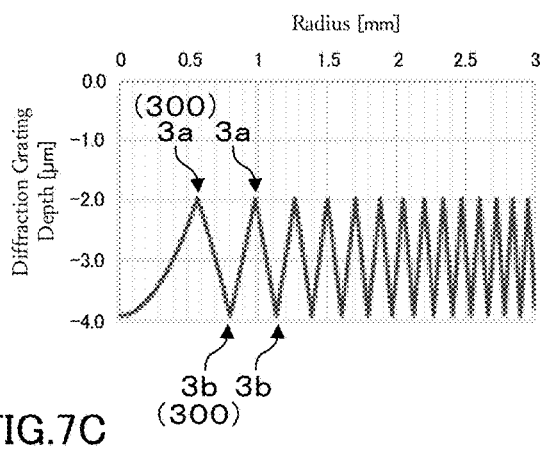
FIGS. 7A and 7B are diagrams illustrating diffractive grating geometries of multifocal diffractive lenses of Example 4 in a third embodiment.
Figure 7B:
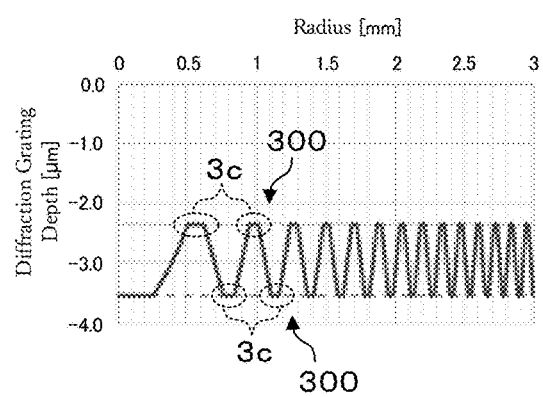
Figure 7C:
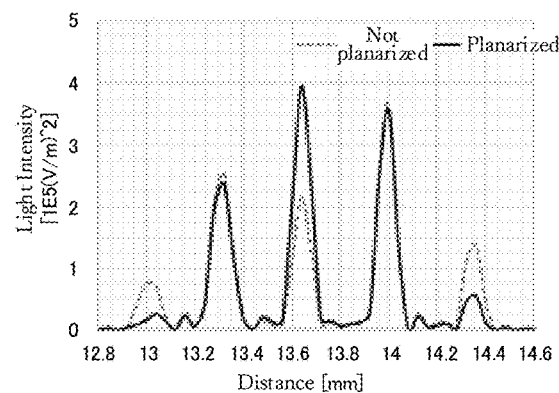
FIG. 7C is a diagram illustrating light intensities of the multifocal diffractive lenses of Example 4.
Figure 7D:
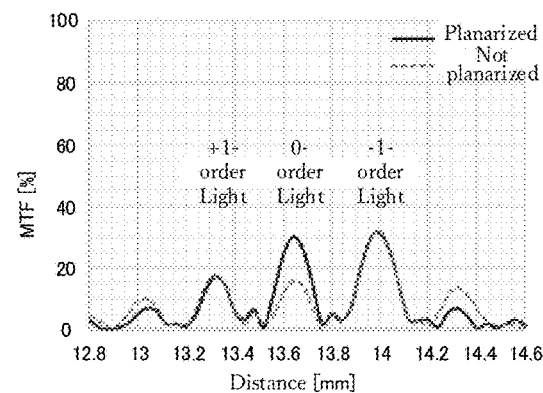
FIG. 7D is a diagram illustrating MTFs of the multifocal diffractive lenses of Example 4.

In relation to the jagged part 300 (which collectively refers to ridges 3a and grooves 3b) in the diffraction grating geometry with a height of 1.97 μm of the trifocal diffractive lens of FIG. 6C with −1.5D, 0D, and +1.5D additions shown in FIG. 7A, comparison is made for the case where ridges 3a and grooves 3b shown in FIG. 7B are respectively planarized with a restriction value of 0.4 μm, which is 20% of the height of the diffraction grating geometry. As shown in FIG. 7B, the jagged part 300 of the diffraction grating geometry of Example 4 includes planarized regions 3c. FIG. 7C is a diagram illustrating light intensities of the unplanarized diffractive lens shown in FIG. 7A and the planarized diffractive lens shown in FIG. 7B, while FIG. 7D is a diagram illustrating MTFs of the unplanarized diffractive lens shown in FIG. 7A and the planarized diffractive lens shown in FIG. 7B.

As shown in FIG. 7C, it can be confirmed by comparison of light intensity peaks at respective focal positions that the light intensity peak at the focal point for intermediate vision (0-order light) is largely increased to balance the decreases in the light intensity peaks of ±2-order light and that the total gathered light amount to the desired range of the focal points is increased from $1.96 \times 10^6$ $(V/m)^2$ to $2.32 \times 10^6$ $(V/m)^2$, that is, increased to 1.18 times. Further, as shown in FIG. 7D, the MTF result indicates a similar result to the light intensity. While the entire jagged part 300 is planarized in this example, part of the jagged part 300 may be planarized and the above-described ratio of the 20% planarization may be adjusted.

Figure 8A:
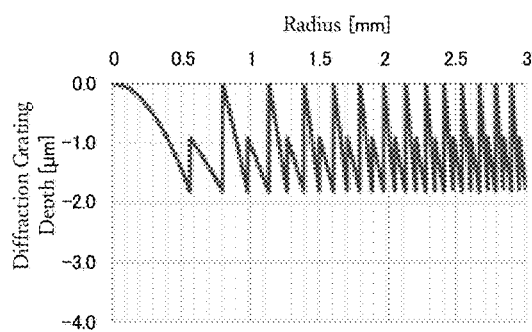
FIGS. 8A and 8B are diagrams illustrating diffraction grating geometries of multifocal diffractive lenses of Comparative Example 3.
Figure 8B:
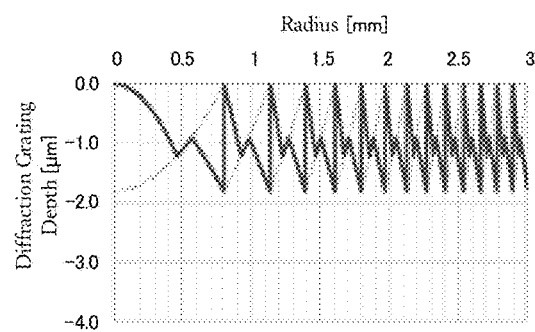
Figure 8C:
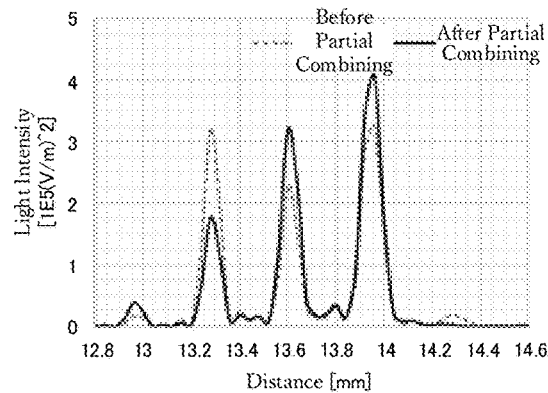
FIG. 8C is a diagram illustrating light intensities of the multifocal diffractive lenses of Comparative Example 3.
Figure 8D:
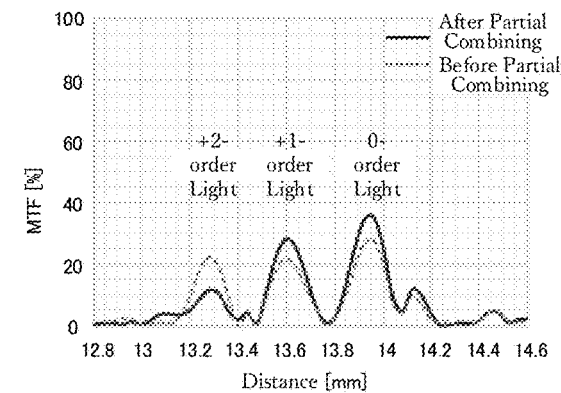
FIG. 8D is a diagram illustrating MTFs of the multifocal diffractive lenses of Comparative Example 3.

It is noted that the commonly-used trifocal diffractive lens of Comparative Example 3 with additions of 0D, +1.5D, and +3D as shown in FIG. 6I may be combined with part of the diffraction grating geometry with an addition of −1.5D, which has the same diffraction fringe pitch as that of the diffraction grating geometry with an addition of +1.5D. FIG. 8A shows the diffraction grating geometry before the partial combining and FIG. 8B shows the diffraction grating geometry after the partial combining. FIG. 8C is a diagram illustrating light intensities of the diffractive lens before the partial combining shown in FIG. 8A and the diffractive lens after the partial combining shown in FIG. 8B, while FIG. 8D is a diagram illustrating MTFs of the diffractive lens before the partial combining shown in FIG. 8A and the diffractive lens after the partial combining shown in FIG. 8B. As shown in FIG. 8C, it can be confirmed that, in Comparative Example 3, the light intensity peaks at the focal point for intermediate vision (+1-order light) and the focal point for far vision (0-order light) are increased to balance the decrease in the light intensity peak at the focal point for near vision (+2-order light) and the total gathered light amount to the desired range of the focal points is increased from $2.10 \times 10^6$ $(V/m)^2$ to $2.24 \times 10^6$ $(V/m)^2$, that is, increased to 1.06 times. Further, as shown in FIG. 8D, the MTF result indicates a similar result to the light intensity. Accordingly, Example 4 achieves a larger increase in the total gathered light amount to the desired range of the focal points than Comparative Example 3, causing a larger effect of enabling to allocate light which may be potentially delivered to an unintended focal position of high-order light to a focal position of low-order light.

Example 5

<Comparison Between Planarization and Conventional Kinoform in Relation to Corner Radius Caused by Machining>

In Example 5, a description is given of corner radii formed during cutting machining in the diffraction grating geometry of the multifocal diffractive lens 100.

Figure 9A:
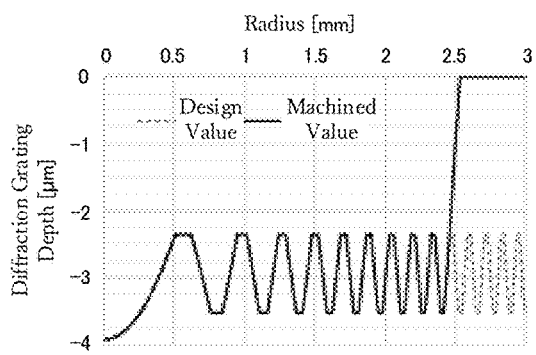
FIG. 9A is a diagram illustrating a diffraction grating geometry of a multifocal diffractive lens of Example 5.
Figure 9D:
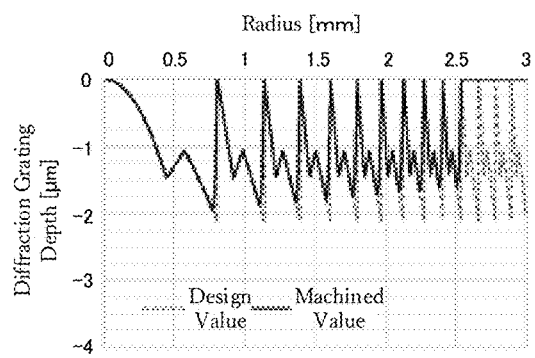
FIG. 9D is a diagram illustrating a diffraction grating geometry of Comparative Example 4.
Figure 9B:
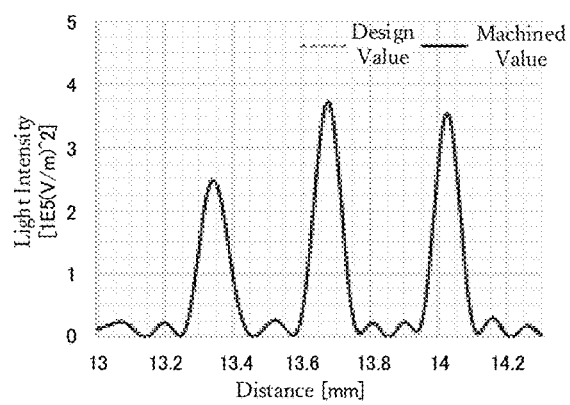
FIG. 9B is a diagram illustrating a light intensity of the lens for a pupil diameter $\phi$ of 3 mm in Example 5.
Figure 9E:
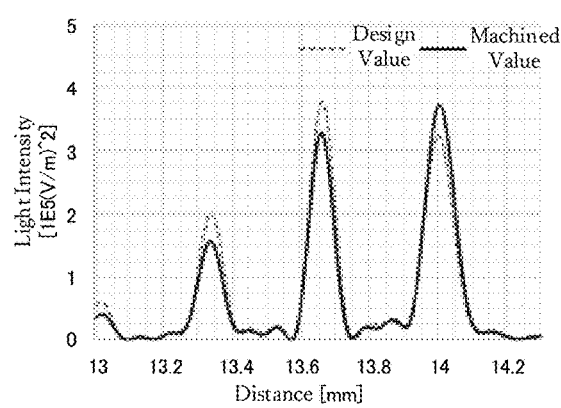
FIG. 9E is a diagram illustrating a light intensity of the lens for a pupil diameter $\phi$ of 3 mm in Comparative Example 4.
Figure 9C:
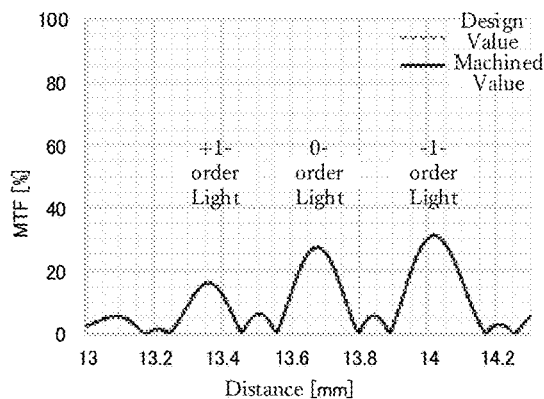
FIG. 9C is a diagram illustrating an MTF of the lens for the pupil diameter $\phi$ of 3 mm in Example 5.
Figure 9F:
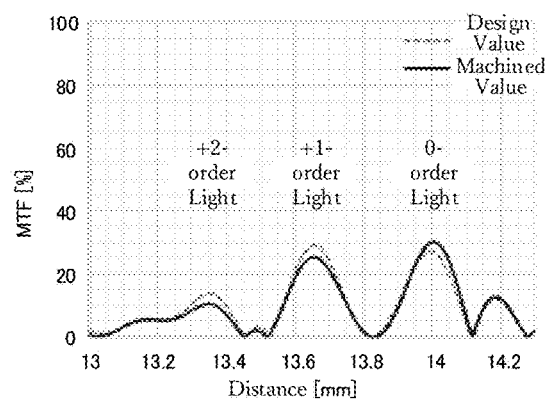
FIG. 9F is a diagram illustrating an MTF of the lens for the pupil diameter $\phi$ of 3 mm in Comparative Example 4.
Figure 10A:
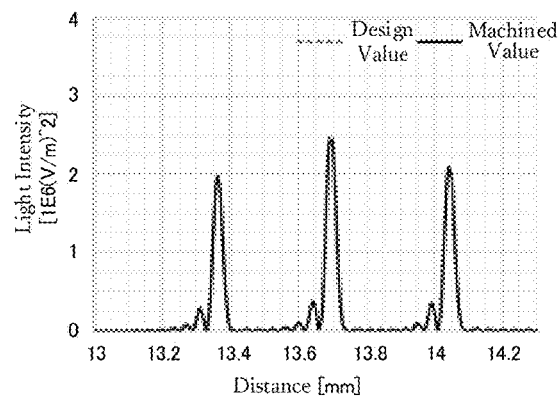
FIG. 10A is a diagram illustrating a light intensity of the lens for a pupil diameter $\phi$ of 5 mm in Example 5.
Figure 10C:
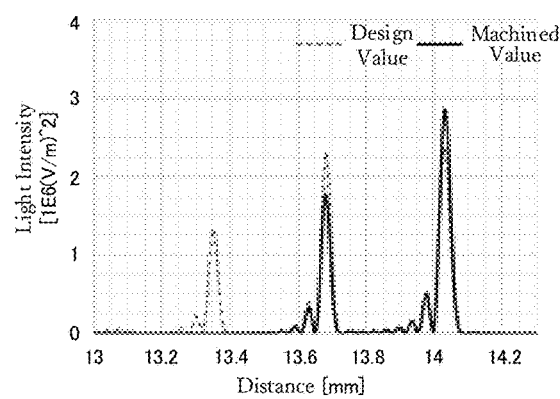
FIG. 10C is a diagram illustrating a light intensity of the lens for a pupil diameter $\phi$ of 5 mm in Comparative Example 4.
Figure 10B:
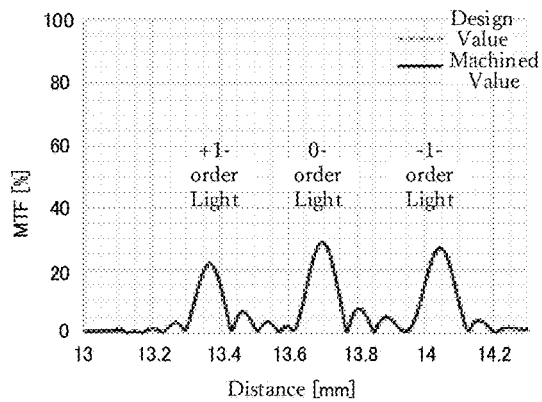
FIG. 10B is a diagram illustrating an MTF of the lens for the pupil diameter $\phi$ of 5 mm in Example 5.
Figure 10D:
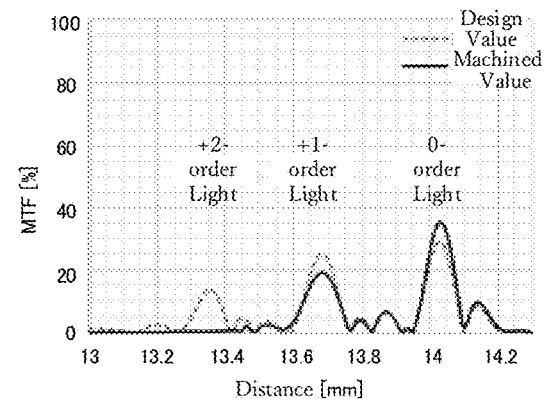
FIG. 10D is a diagram illustrating an MTF of the lens for a pupil diameter $\phi$ of 5 mm in Comparative Example 4.

When a mold of the diffraction grating geometry of Example 4 shown in FIG. 7B is subjected to cutting machining, the grooves 3b (refer to FIG. 7A) are formed with a corner radius, and this may cause deformation of the diffraction grating geometry, not achieving optical performances as expected by simulation results. In Example 5, various simulation results are presented for the case where trifocal lenses with a +3D addition are machined with a cutting tool with a tip radius of 0.3 mm FIG. 9A is a diagram illustrating the diffraction grating geometry of Example 5 (which is the same as that shown in FIG. 7B). FIG. 9B is a diagram illustrating the light intensity of the lens for a pupil diameter φ of 3 mm in Example 5, and FIG. 9C is a diagram illustrating the MTF of the lens for the pupil diameter φ of 3 mm in Example 5. FIG. 10A is a diagram illustrating the light intensity of the lens for a pupil diameter φ of 5 mm in Example 5, and FIG. 10B is a diagram illustrating the MTF of the lens for the pupil diameter φ of 5 mm in Example 5. FIG. 9D is a diagram illustrating the diffraction grating geometry of Comparative Example 4 (which is the same as that shown in FIG. 8B). FIG. 9E is a diagram illustrating the light intensity of the lens for a pupil diameter φ of 3 mm in Comparative Example 4, and FIG. 9F is a diagram illustrating the MTF of the lens for the pupil diameter φ of 3 mm in Comparative Example 4. FIG. 10C is a diagram illustrating the light intensity of the lens for a pupil diameter φ of 5 mm in Comparative Example 4, and FIG. 10D is a diagram illustrating the MTF of the lens for a pupil diameter φ of 5 mm in Comparative Example 4.

As shown in FIG. 9A, the diffraction grating geometry of this embodiment allows the design value and the machined value to be substantially the same, while the commonly-used diffraction grating geometry causes a difference between the design value and the machined value as shown in FIG. 9D. It can be confirmed that the difference increases especially toward the circumference. It is noted that the machined value of the commonly-used diffraction grating geometry exhibits a profile in which the diffraction grating height is less than the design value, and this results in an increase in the light allocation to the focal point for far vision (0-order light) and a decrease in the light allocation to the focal point for near vision (+2-order light). This phenomenon is also confirmed by the simulation results of the light intensities and the MTFs shown in FIGS. 9E, 9F, 10C, and 10D. It can be confirmed that this effect becomes more significant with an increase in the pupil diameter, resulting in that the focal point for near vision is missing for the pupil diameter φ of 5 mm. While the results are presented for the cutting tool with the tip radius of 0.3 mm in Example 5, this tendency is weakened by reducing the tip radius of the cutting tool. It is suggested however that this approach causes the cutting tool to be easily broken, suffering from poor durability of the cutting tool. Accordingly, the diffraction grating geometry of this embodiment can be concluded as being easy to machine through cutting. Further, it is also suggested that, although sharpened tips are weak against the cutting resistance and the shapes of the sharpened tips are likely to be deformed, planarizing the entire jagged part will provide improvement, reducing the deformation caused by the cutting machining

[Additional Note]

Example 6

<MTF Measurement Results of Experimental Products of Embodiments and Existing Lenses>

In Example 6, comparison was made between existing lenses and a multifocal diffractive lens with the diffraction grating geometry shown in FIG. 9A to verify the effectiveness of shifting the focal point for far vision nearer to the lens in polychromatic performance evaluation.

The MTF measurement results (monochromatic performance and polychromatic performance) for the lenses in Example 6 were acquired as described below. A halogen lamp is used as a light source for white light evaluation. For monochromatic light evaluation, light of 546 nm is extracted from the halogen lamp by using an interference filter.

Figure 11A:
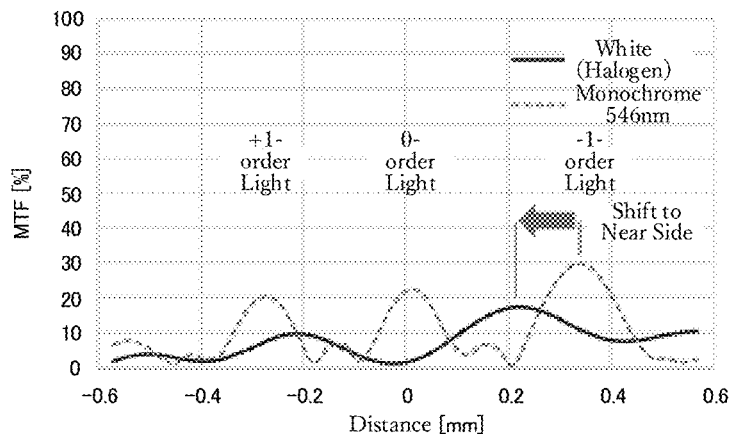
FIG. 11A is a diagram illustrating MTFs of a multifocal diffractive lens of Example 6.
Figure 11B:
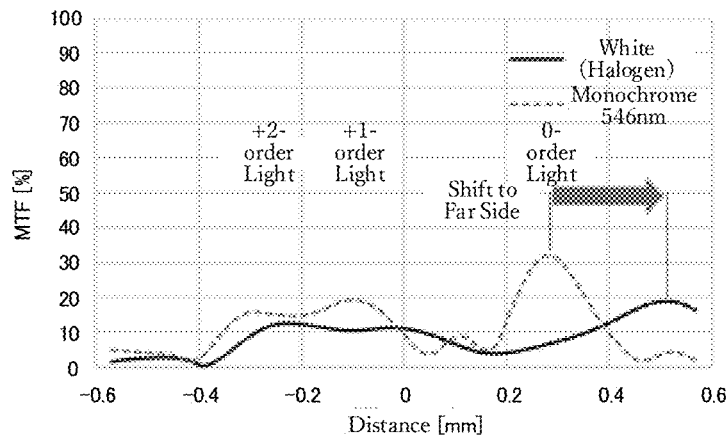
FIGS. 11B and 11C are diagrams illustrating MTFs of existing multifocal diffractive lenses.
Figure 11C:
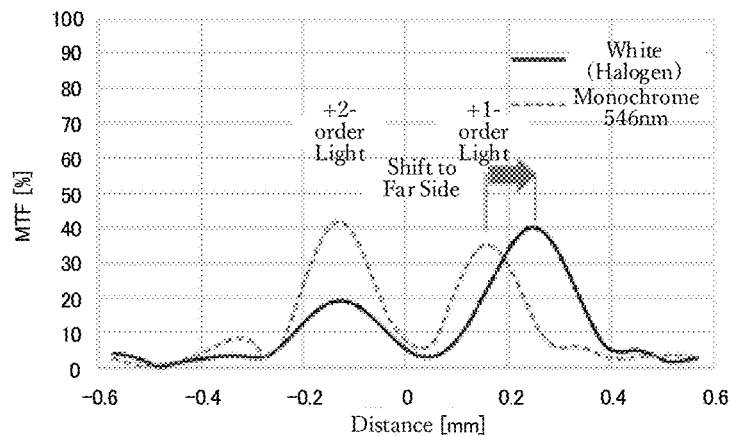

FIGS. 11A to 11C respectively show MTF measurement results for an experimental product of this embodiment that causes negative-order light to produce the focal point for far vision, exiting lens A that causes 0-order light to produce the focal point for far vision, and exiting lens B that causes positive-order light to produce the focal point for far vision. More Specifically, FIG. 11A is a diagram illustrating through-focus MTF measurement results of the experimental product (the focal point for far vision=−1-order light and the focal point for intermediate vision=0-order light). FIG. 11B is a diagram illustrating through-focus MTF measurement results of existing lens A (the focal point for far vision=0-order light and the focal point for intermediate vision=+1-order light), and FIG. 11C is a diagram illustrating through-focus MTF measurement results of existing lens B (the focal point for far vision=+1-order light and the focal point for intermediate vision=+2-order light). As shown in FIG. 11A, the experiment product, which causes negative-order light to produce the focal point for far vision and 0-order light to produce the focal point for intermediate vision, is configured such that the focal point for far vision in polychromatic performance evaluation is located nearer to the lens than the focal point for far vision in monochromatic performance evaluation. In contrast, as shown in FIGS. 11B and 11C, existing lens A, which causes 0-order light to produce the focal point for far vision and positive-order light to produce the focal point for intermediate vision, and existing lens B, which causes positive-order light to produce both the focal points for far vision and intermediate vision, are configured such that the focal point for far vision in polychromatic performance evaluation is located farther from the lens than the focal point for far vision in monochromatic performance evaluation. The same tendencies have been observed between the simulation results and the actual product test results. Accordingly, it is suggested that the experimental product of this embodiment achieves efficient light use for white light.

Fourth Embodiment

In the following, a description is given of a multifocal diffractive lens, according to a fourth embodiment. It is noted that the multifocal diffractive lens of the fourth embodiment is a modification of the multifocal diffractive lenses of the first, second, and third embodiments, configured similarly to the first embodiment and the like if not specifically described.

Figure 13A:
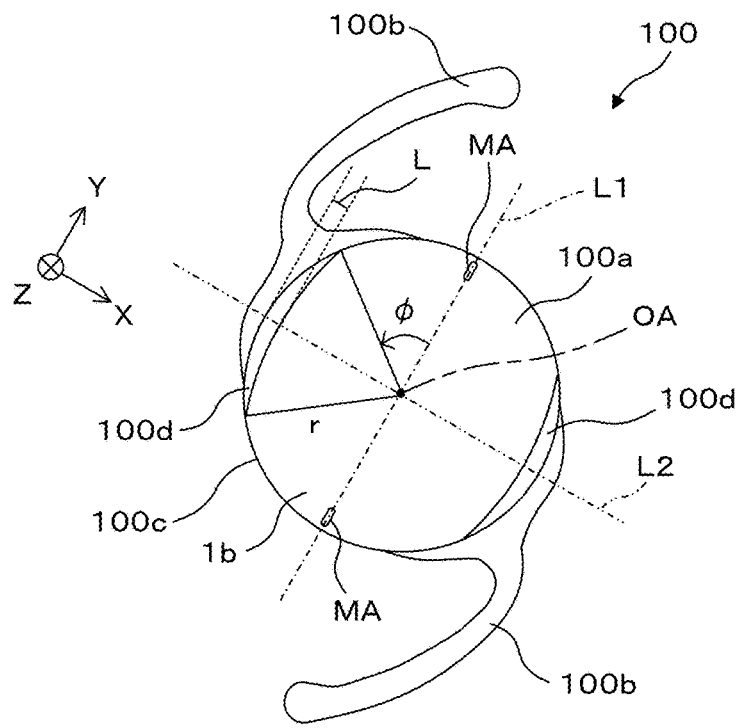
FIG. 13A is a base view of a multifocal diffractive lens in a fourth embodiment.
Figure 13B:
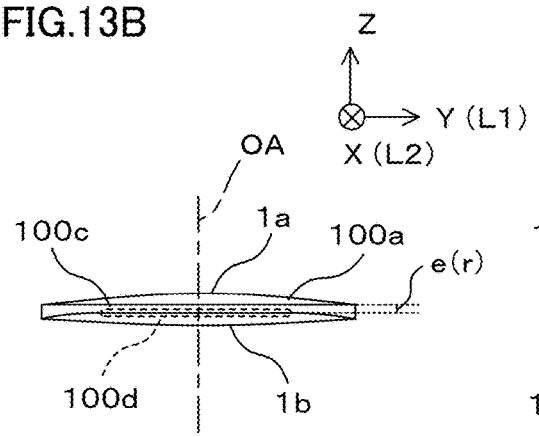
FIG. 13B is a schematic side view in parallel to a flat meridian of the multifocal diffractive lens.
Figure 13C:
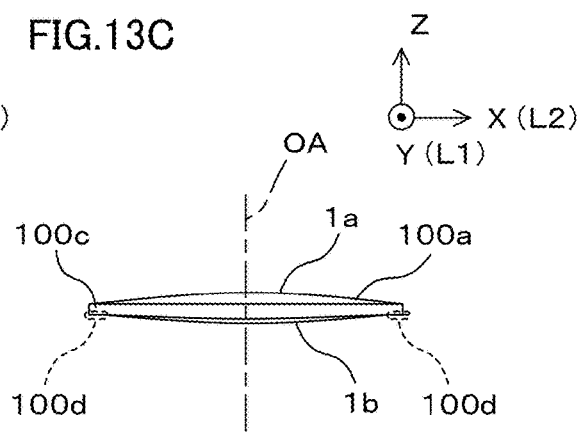
FIG. 13C is a schematic side view in parallel to a steep meridian of the multifocal diffractive lens.

FIG. 13A is a base view of a multifocal diffractive lens 100, according to the fourth embodiment. FIG. 13B is a schematic side view in parallel to the flat meridian L1 of the multifocal diffractive lens 100, and FIG. 13C is a schematic side view in parallel to the steep meridian L2 of the multifocal diffractive lens 100. It is noted that, for easy understanding of the description, FIGS. 13B and 13C show schematic illustrations in which the supports 100b are removed from the multifocal diffractive lens 100 of FIG. 13A.

As shown in FIGS. 13A to 13C, the multifocal diffractive lens 100 of this embodiment includes a diffraction grating on the first optical surface 1a, which is one of the optical surfaces, and the second optical surface 1b, which is the other optical surface, has a toric shape (or a toric surface). No description is given of the first optical surface 1a since the first optical surface 1a is as described in relation to the first embodiment.

In the multifocal diffractive lens 100, the toric surface of the second optical surface 1b generates a difference in the lens refractive power in the meridian directions between the flat meridian L1 and the steep meridian L2, which are defined on the surface orthogonally to each other. It is possible to correct astigmatism by using this difference. The steep meridian L2 is a meridian on the toric surface defined in a direction in which a larger refractive power is generated and the flat meridian L1 is a meridian defined in a direction in which a smaller refractive power is generated.

The cross-section profile in an arbitrary meridian direction (angle θ) on the second optical surface 1b of the multifocal diffractive lens 100 is represented by formulas including the following formula:

$$Z = \frac{cr^2}{1 + \sqrt{1 - (\kappa + 1)c^2 r^2}} + A(\theta)r^2 + B(\theta)r^4,$$

where c is the paraxial curvature of the multifocal diffractive lens 100 before provision of the toric surface defined by the second and subsequent terms; r is the distance from the optical axis OA of the multifocal diffractive lens 100; and k is the conic constant of the surface of the multifocal diffractive lens 100 rotation-symmetric with respect to the optical axis OA before the provision of the toric surface. The parameters c, r, and k are common for the meridian directions on the second optical surface 1b. Also, A(0) and B(0), which are parameters represented by functions that depend on the angle in the meridian direction, are given by the following formulae:

$$A(\theta) = \alpha_{2x} \cos^2\theta + \alpha_{2y} \sin^2\theta, \text{ and}$$

$$B(\theta) = \alpha_{4x} \cos^4\theta + \alpha_{2x2y} \cos^2\theta \sin^2\theta + a_{4y} \sin^4\theta.$$

As shown in FIG. 13A, toric marks MA, which are marks indicating the astigmatism axis, are formed on the lens body 100a of the multifocal diffractive lens 100. More specifically, a pair of toric marks MA are disposed near the circumference of the toric surface (the second optical surface 1b) of the lens body 100a to be opposed to each other across the optical axis OA of the lens body 100a. A hypothetically-defined line that connects the pair of toric marks MA represents a first axis (e.g., the flat meridian L1) of the lens body 100a while another line that crosses the optical axis OA of the lens body 100a and is orthogonal to the first axis represents a second axis (e.g., the steep meridian L2). Use of the toric marks MA enables to adjust the position of the multifocal diffractive lens 100 after the multifocal diffractive lens 100 is inserted into an eyeball of a patient so that the astigmatism axis of the cornea of the patient (the axis of the steep meridian of the cornea) is coincident with the toric axis of the multifocal diffractive lens 100 (the axis of the flat meridian of the lens).

Figure 14A:
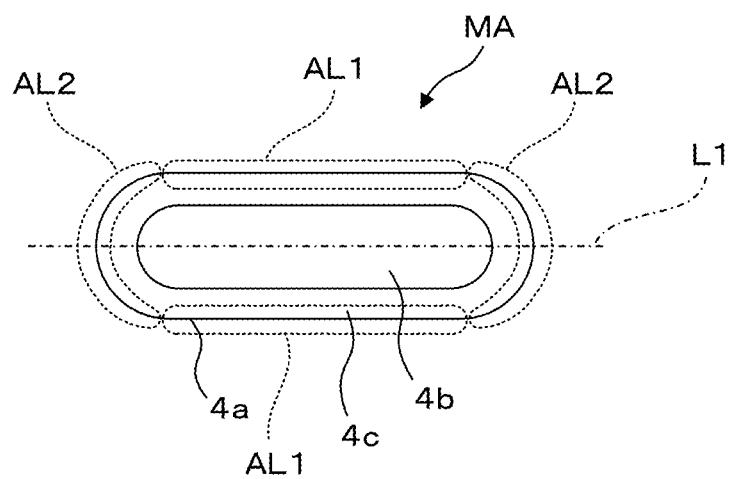
FIG. 14A is an enlarged view of a toric mark disposed on the multifocal diffractive lens shown in FIG. 13A.
Figure 14B:
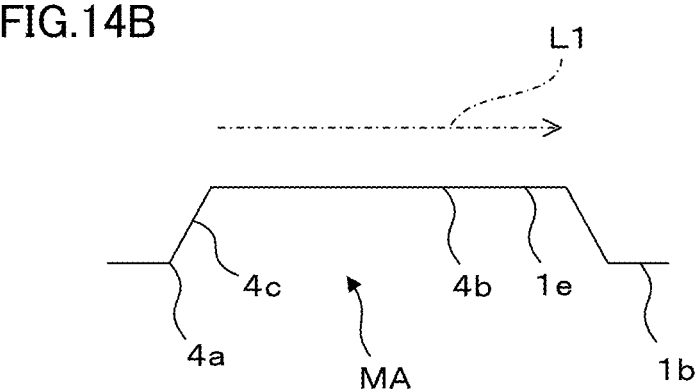
FIG. 14B is a section view of the toric mark.

As shown in an enlarged view of FIG. 14A, the toric mark MA is shaped in a corner-rounded rectangular shape in the top view of the second optical surface 1b. In relation to the outer shape of the toric mark MA, the length of the toric mark MA in the radius direction of the lens body 100a is different from the length of the toric mark MA in the circumferential direction of the lens body 100a. More specifically, the toric mark MA has longer sides in the radial direction of the lens body 100a and shorter sides in the circumferential direction. The peripheral part 4a of the toric mark MA is formed by a pair of straight lines AL1 parallel to the flat meridian L1 as the longer sides and curved lines AL2 that connect the pair of straight lines AL1 with parabolic lines as the shorter sides. By using this shape as the outer shape of the toric mark MA, it possible to determine the direction of the astigmatic axis based on the shape of the peripheral part 4a during alignment of the astigmatic axis after insertion of the multifocal diffractive lens 100 even when only one end of the toric mark MA is viewable. As shown in FIG. 14B, the toric mark MA has a recess 1e on a section in the direction of the optical axis OA. The recess 1e has a bottom face 4b and a slanting face 4c that extends from the peripheral part 4a and is connected to the bottom face 4b. It is noted that the outer shape of the toric mark MA may be an oval, an ellipse, or a polygon with longer sides and shorter sides such as a rectangle. The peripheral part 4a may be beveled, and the bottom face 4b and the slanting face 4c may include a curved face.

As shown in FIGS. 13A to 13C, the multifocal diffractive lens 100 includes flat portions 100d at the edge portion 100c of the lens body 100a. The end thickness of the flat portions 100d is substantially constant. The flat portions 100d are configured to include the edge portion 100c that overlaps the steep meridian L2 when viewed from the lens center (the optical axis OA). More specifically, the steep meridian L2 overlaps with the X axis shown in FIG. 13A. In this embodiment, a pair of flat portions 100d are disposed at the edge portion 100c of the toric surface (the second optical surface 1b) of the lens body 100a such that the pair of flat portions 100d are opposed to each other across the optical axis OA of the lens body 100a. The shape of the flat portions 100d are defined to be substantially line symmetric to the X axis, i.e., the steep meridian L2. Part of the flat portions 100d may be shaped with a gently slanting face, a curved face, or the like. In this case, the curvature near the steep meridian L2 corresponding to the flat portions 100d at the edge portion 100c of the lens body 100a is smaller than the curvature near the flat meridian L1.

Let e(r) be the end thickness of the flat portions 100d at the position of a radius r from the lens center. By appropriately determining the end thickness e(r), it is possible to determine the range of the angle φ viewed from the lens center in which the flat portions 100d are formed and the width L of the flat portions 100d in the radius direction of the lens body 100a with respect to the top view of the second optical surface 1b. Since the toric surface of the second optical surface 1b is defined in accordance with the above-described formula, it is possible to determine the lines of intersection between the toric surface of the second optical surface 1b and the flat surfaces of the flat portions 100d by determining the end thickness e(r).

The end thickness e(r) of the flat portions 100d is determined to be thinner than the end thickness of the lens body 100a on the flat meridian L1 and thicker than the thickness of the end portions if the flat portions 100d are formed as the toric surface of the lens body 100a. This results in that the end thickness of the lens body 100a on the flat meridian L1, i.e., the end thickness of a portion that overlaps the Y axis is determined similarly to conventional lens bodies. Although the end thickness along the steep meridian L2 is conventionally thin, securing the end thickness along the steep meridian L2 at a predetermined thickness as discussed in the present embodiment enables to maintain an end thickness that maintains the effect of preventing secondary cataract while avoiding the center thickness of the lens body 100a being unnecessary thick. Further, it is possible to stably acquire force to bias the lens body 100a onto the posterior capsule of the crystal lens with the supports 100b even when the supports 100b are disposed on the flat portions 100d, since the end thickness along the steep meridian L2 is secured at the predetermined thickness.

Figure 13D:
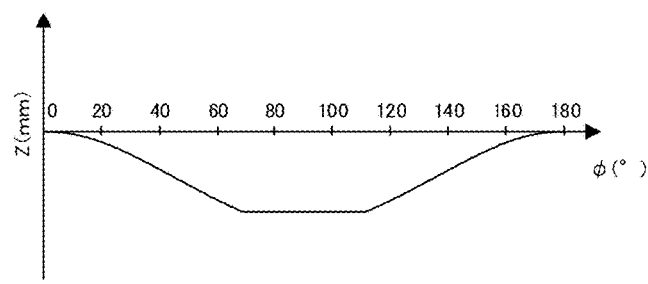
FIG. 13D is a diagram showing one example of a change of the end thickness viewed from the lens center of the lens body in the angle direction.

FIG. 13D is a diagram showing one example of the change of the end thickness e(r) viewed from the lens center of the lens body 100a in the angle direction. In FIG. 13D, the horizontal axis represents the angle φ (unit: °) and the vertical axis represents the sag amount Z (unit: mm) of the second optical surface 1b. The directions of angles φ of 0° and 180° correspond to the directions along the flat meridian L1 of the lens body 100a while the direction of an angle φ of 90° corresponds to the directions along the steep meridian L2 of the lens body 100a. It is noted that the change of the end thickness e(r) in a range of the angle φ between 180° and 360° is the same as the change of the end thickness e(r) in a range of the angle φ between 0° and 180°.

In the example shown in FIG. 13D, the end thickness e(r) of the lens body 100a is substantially constant in the range between 70° and 110°, which includes the direction of the steep meridian L2 (where the angle φ is 90°). In other words, a flat portion 100d is formed in this angle range.

While the supports 100b are disposed opposed to each other across the flat meridian L1 and connected to the flat portions 100d in the example shown in FIG. 13A, the arrangement of the supports 100b may be modified if appropriate.

Although the present invention has been described above with reference to embodiments, the present invention is not limited to the above-described embodiments or the like. For example, the diffraction grating geometry of the multifocal diffractive lens 100 may be variously modified as long as the conditions given in the above-described embodiments are satisfied.

In the above-described embodiments, the orders of the diffracted light that produces the focal points for near vision, intermediate vision, and far vision may be modified if appropriate as long as negative-order light produces the focal point for far vision, 0-order light produces a focal point nearer to the lens than that for far vision, and the focal position for far vision in polychromatic performance evaluation is located nearer to the multifocal diffractive lens 100 than the focal position for far vision in monochromatic performance evaluation.

Also, the multifocal diffractive lens 100 of the above-described embodiments may be used for various ophthalmic lenses.

Although the above-described embodiments recite that the first optical surface 1a, which is one of a pair of optical surfaces of the multifocal diffractive lens 100, includes a diffraction grating and the second optical surface 1b, which is the other of the pair of optical surfaces, includes a spherical surface, an aspherical surface, a toric surface or the like, the first optical surface 1a may include a spherical surface, an aspherical surface, a toric surface or the like while the second optical surface 1b may include a diffraction grating.

The invention claimed is:

1. A multifocal diffractive intraocular lens (IOL), comprising an optic defining an anterior optical surface, a posterior optical surface, and a diffraction grating formed in one of the anterior and posterior optical surfaces,
   wherein the diffraction grating is in a combined shape of a first kinoform profile with a diffraction grating geometry with a positive-power addition and a second kinoform profile with a diffraction grating geometry with a negative-power addition,
   wherein negative-order light produces a focal point for far vision and 0-order light produces a focal point nearer to the multifocal diffractive lens than that for the far vision,
   wherein positive-order light produces a focal point nearer to the multifocal diffractive lens than that of the 0-order light,
   wherein a number of focal points is three or more,
   wherein a focal position for the far vision in polychromatic performance evaluation is located nearer to the multifocal diffractive lens than the focal position for the far vision in monochromatic performance evaluation,
   wherein the diffraction grating has a constant height.

2. The multifocal diffractive intraocular lens of claim 1, wherein a correction term of a medium refractive index is added to the kinoform profiles.

3. The multifocal diffractive intraocular lens of claim 1, wherein a correction term of a pupil dilation ratio is added to the kinoform profiles.

4. The multifocal diffractive intraocular lens of claim 1, wherein the multifocal diffractive intraocular lens is a trifocal diffractive intraocular lens that has one additional focal point in addition to two focal points produced by a bifocal diffractive lens, wherein a near addition power of the trifocal diffractive intraocular lens is twice of that of the bifocal diffractive lens, and wherein a number of diffraction fringes is the same between the bifocal diffractive lens and the trifocal diffractive intraocular lens.

5. The multifocal diffractive intraocular lens of claim 1, wherein the multifocal diffractive intraocular lens is a quadrifocal diffractive intraocular lens that has two additional focal points in addition to two focal points produced by a bifocal diffractive lens, wherein a near addition power of the quadrifocal diffractive intraocular lens is three times of that of the bifocal diffractive lens, and wherein a number of diffraction fringes is the same between the bifocal diffractive lens and the quadrifocal diffractive intraocular lens.

6. The multifocal diffractive intraocular lens of claim 1, wherein the diffraction grating has a height of half of a diffraction grating height of the two kinoform profiles, wherein light is allocated to the negative-order light that produces a focal point farther from the multifocal diffractive intraocular lens than that of the 0-order light and the positive-order light that produces a focal point nearer to the multifocal diffractive intraocular lens than that of the 0-order light, and wherein an order of the negative-order light is the same as an order of the positive-order light.

7. The multifocal diffractive intraocular lens of claim 1, wherein diffraction grating heights of the two kinoform profiles are different from each other, wherein light is allocated to the negative-order light that produces a focal point farther from the multifocal diffractive intraocular lens than that of the 0-order light and the positive-order light that produces a focal point nearer to the multifocal diffractive intraocular lens than that of the 0-order light, and wherein an order of the negative-order light and an order of the positive-order light are different from each other.

8. The multifocal diffractive intraocular lens of claim 1, wherein a jagged part of the diffraction grating comprises planarized regions.

9. The multifocal diffractive intraocular lens of claim 1, wherein the multifocal diffractive intraocular lens is formed of optical material with normal dispersion with a material refractive index between 1.45 and 1.56, inclusive, at a wavelength of 546 nm, and wherein power setting between respective focal points is 0.75D or more.

10. The multifocal diffractive intraocular lens of claim 1, wherein the other of the anterior and posterior optical surfaces is in a toric shape.

11. The multifocal diffractive intraocular lens of claim 1,
   wherein the multifocal diffractive intraocular lens is a trifocal diffractive lens of −1-order, 0-order, and +1-order,
   wherein the diffraction grating is in a combined shape of a first kinoform profile with a diffraction grating geometry with a positive-power addition corresponding to +1-order light and the 0-order light and a second kinoform profile with a diffraction grating geometry with a negative-power addition corresponding to −1-order light and the 0-order light.

12. The multifocal diffractive intraocular lens of claim 1,
   wherein the multifocal diffractive lens is a quadrifocal diffractive lens of −1-order, 0-order, +1-order, and +2-order,
   wherein the diffraction grating is in a combined shape of a first kinoform profile with a diffraction grating geometry with a positive-power addition corresponding to +1-order light and +2-order light and a second kinoform profile with a diffraction grating geometry with a negative-power addition corresponding to −1-order light and the 0-order light.

13. The multifocal diffractive intraocular lens of claim 1,
   wherein a number of diffraction fringes is the same between the two kinoform profiles,
   wherein a number of diffraction fringes of the diffraction grating is the same as the number of diffraction fringes of the kinoform profile.

14. The multifocal diffractive intraocular lens of claim 1,
   wherein a height of the diffraction grating is lower than heights of the two kinoform profiles.

* * * * *